(12) United States Patent  
Hou et al.

(10) Patent No.: US 12,501,404 B2  
(45) Date of Patent: Dec. 16, 2025

(54) ELECTRONIC DEVICE, METHOD, AND STORAGE MEDIUM FOR WIRELESS COMMUNICATION

(71) Applicant: Sony Group Corporation, Tokyo (JP)

(72) Inventors: Yanzhao Hou, Beijing (CN); Xiaofeng Tao, Beijing (CN); Yang Wen, Beijing (CN); Chengrui Wang, Beijing (CN); Xiaoxue Wang, Beijing (CN); Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 459 days.

(21) Appl. No.: 18/017,676

(22) PCT Filed: Jul. 30, 2021

(86) PCT No.: PCT/CN2021/109664  
§ 371 (c)(1),  
(2) Date: Jan. 24, 2023

(87) PCT Pub. No.: WO2022/028327  
PCT Pub. Date: Feb. 10, 2022

(65) Prior Publication Data  
US 2023/0300798 A1  Sep. 21, 2023

(30) Foreign Application Priority Data  
Aug. 3, 2020  (CN) .......................... 202010769120.3

(51) Int. Cl.  
*H04W 72/02* (2009.01)  
*H04W 28/18* (2009.01)  
(Continued)

(52) U.S. Cl.  
CPC ........... *H04W 72/02* (2013.01); *H04W 28/18* (2013.01); *H04W 72/0446* (2013.01); *H04W 72/0453* (2013.01); *H04W 72/25* (2023.01)

(58) Field of Classification Search  
CPC ... H04W 28/18; H04W 72/0446; H04W 4/40; H04W 72/25  
See application file for complete search history.

(56) References Cited

U.S. PATENT DOCUMENTS 11,510,179 B2 * 11/2022 Chae ................. H04W 72/0453  
11,812,477 B2 * 11/2023 Bae ......................... H04L 1/189  
(Continued)

FOREIGN PATENT DOCUMENTS

CN    110351858 A    10/2019  
CN    110830952 A    2/2020  
(Continued)

OTHER PUBLICATIONS

International Search Report and Written Opinion mailed on Oct. 25, 2021, received for PCT Application PCT/CN2021/109664, filed on Jul. 30, 2021, 8 pages including English Translation.

*Primary Examiner* — Raj Jain  
(74) *Attorney, Agent, or Firm* — XSENSUS LLP

(57) ABSTRACT

The present disclosure relates to an electronic device, a method, and a storage medium for a wireless communication system. Various embodiments regarding resource allocation and management for sidelink communication are described. In an embodiment, an electronic device for a first terminal device includes a processing circuit configured to: search for time-frequency resources based on at least two allocation modes to obtain a candidate resource set; select a time-frequency resource from the candidate resource set; and notify a second terminal device of the selected time-frequency resource to be used for sidelink communication with the second terminal device. The processing circuit is (Continued)

further configured to send resource selection information to a base station, where the resource selection information indicates whether a specified resource is selected.

12 Claims, 18 Drawing Sheets

(51) Int. Cl.
*H04W 72/0446* (2023.01)
*H04W 72/0453* (2023.01)
*H04W 72/25* (2023.01)

(56) References Cited

U.S. PATENT DOCUMENTS

| | | |
|---|---|---|
| 2020/0008176 A1 | 1/2020 | Shukair et al. |
| 2020/0128470 A1 | 4/2020 | Mok et al. |
| 2020/0128585 A1* | 4/2020 | Kuang ................... H04L 5/0094 |
| 2021/0329501 A1* | 10/2021 | Dutta ..................... H04W 28/26 |
| 2022/0015070 A1* | 1/2022 | Chen .................. H04W 72/1263 |
| 2023/0057436 A1* | 2/2023 | Kang ..................... H04W 28/26 |
| 2023/0300798 A1* | 9/2023 | Hou .................. H04W 72/0453 |
| | | 370/329 |

FOREIGN PATENT DOCUMENTS

| | | |
|---|---|---|
| CN | 110958096 A | 4/2020 |
| CN | 110972316 A | 4/2020 |
| CN | 111132296 A | 5/2020 |

\* cited by examiner

| | |
|---|---|
| Frequency-domain information format | $\log_2 N_{subChannel}^{SL}$ bits, sl-MaxNumPerReserve = 1;<br><br>$\left\lceil \log_2 \left( \frac{N_{subChannel}^{SL}\left(N_{subChannel}^{SL}+1\right)}{2} \right) \right\rceil$ bits, sl-MaxNumPerReserve = 2;<br><br>$\left\lceil \log_2 \left( \frac{N_{subChannel}^{SL}\left(N_{subChannel}^{SL}+1\right)\left(2N_{subChannel}^{SL}+1\right)}{6} \right) \right\rceil$ bits, sl-MaxNumPerReserve = 3; |
| Time-domain information format | 3 bits, sl-MaxNumPerReserve = 1;<br><br>5 bits, sl-MaxNumPerReserve = 2;<br><br>9 bits, sl-MaxNumPerReserve = 3; |

FIG. 10

ELECTRONIC DEVICE, METHOD, AND STORAGE MEDIUM FOR WIRELESS COMMUNICATION

CROSS-REFERENCE TO RELATED APPLICATIONS

The present application is based on PCT filing PCT/CN2021/109664, filed Jul. 30, 2021, which claims priority to Chinese Application No. 202010769120.3, filed on Aug. 3, 2020, and entitled "ELECTRONIC DEVICE, METHOD, AND STORAGE MEDIUM FOR WIRELESS COMMUNICATION", the disclosure of each of which is incorporated herein by reference in its entirety.

TECHNICAL FIELD

The present disclosure generally relates to a device and a method for wireless communication, and in particular, to a resource allocation and management technology for sidelink (SL) communication.

BACKGROUND

The development and application of wireless communication technologies has unprecedentedly satisfied people's voice and data communication needs. To enrich the application scenarios of wireless communication, different levels of technology are constantly applied to wireless communication systems. Sidelink communication is introduced to wireless communication systems that have been or are being developed such as Long Term Evolution (LTE) and New Radio (NR) of the Third Generation Partnership Project (3GPP), in order to support device-to-device (D2D) communication, machine-to-machine (M2M) communication, vehicle-to-vehicle (V2V) communication, and vehicle to everything (V2X) communication.

A specified time-frequency resource is required for sidelink communication between terminal devices. Therefore, a resource allocation and management solution for sidelink communication is expected, so as to ensure performance of sidelink communication.

SUMMARY

A first aspect of the present disclosure relates to an electronic device for a first terminal device. The electronic device includes a processing circuit. The processing circuit is configured to search for time-frequency resources based on at least two allocation modes to obtain a candidate resource set; select a time-frequency resource from the candidate resource set; and notify a second terminal device of the selected time-frequency resource to be used for sidelink communication with the second terminal device. The processing circuit is further configured to send resource selection information to a base station, where the resource selection information indicates whether a specified resource is selected.

A second aspect of the present disclosure relates to an electronic device for a base station. The electronic device includes a processing circuit. The processing circuit is configured to receive a resource scheduling request message from a first terminal device, where the resource scheduling request message is used to request a time-frequency resource for sidelink communication between the first terminal device and a second terminal device. The processing circuit is further configured to: allocate the time-frequency resource to the first terminal device based on a first allocation mode; send a resource grant message to the first terminal device; and receive resource selection information from the first terminal device, where the resource selection information indicates whether the time-frequency resource corresponding to the first allocation mode is selected by the first terminal device.

A third aspect of the present disclosure relates to a method for wireless communication. The method includes searching for time-frequency resources based on at least two allocation modes to obtain a candidate resource set; selecting a time-frequency resource from the candidate resource set; and notifying a second terminal device of the selected time-frequency resource to be used for sidelink communication with the second terminal device. The method further includes sending resource selection information to a base station, where the resource selection information indicates whether a specified resource is selected.

A fourth aspect of the present disclosure relates to a method for wireless communication. The method includes receiving a resource scheduling request message from a first terminal device, where the resource scheduling request message is used to request a time-frequency resource for sidelink communication between the first terminal device and a second terminal device. The method further includes allocating the time-frequency resource to the first terminal device based on a first allocation mode; sending a resource grant message to the first terminal device; and receiving resource selection information from the first terminal device, where the resource selection information indicates whether the time-frequency resource corresponding to the first allocation mode is selected by the first terminal device.

A fifth aspect of the present disclosure relates to a computer-readable storage medium with one or more instructions stored therein. In one or more embodiments, the one or more instructions, when executed by one or more processing circuits of an electronic device, cause the electronic device to perform methods according to various embodiments of the present disclosure.

A sixth aspect of the present disclosure relates to an apparatus for wireless communication, including means or units used to perform operations of various methods in the embodiments of the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be achieved by referring to the detailed description given hereinafter in conjunction with the accompanying drawings. The same or similar reference numerals are used in the accompanying drawings to denote the same or similar components. The accompanying drawings together with the following detailed description are included in the specification and form a part of the specification, and are intended to exemplify the embodiments of the present disclosure and explain the principles and advantages of the present disclosure. In the accompanying drawings:

FIG. 10 illustrates an exemplary format of an indicator used to indicate a time-frequency resource according to an embodiment of the present disclosure.

Although the embodiments described in the present disclosure may have various modifications and alternatives, specific embodiments thereof are illustrated as examples in the accompanying drawings and described in detail in this specification. However, it should be understood that the drawings and detailed description thereof are not intended to limit embodiments to the specified forms disclosed, but to cover all modifications, equivalents, and alternatives falling within the spirit and scope of the claims.

DESCRIPTION OF EMBODIMENTS

The following describes representative applications of various aspects of the devices and methods according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Figure 1:
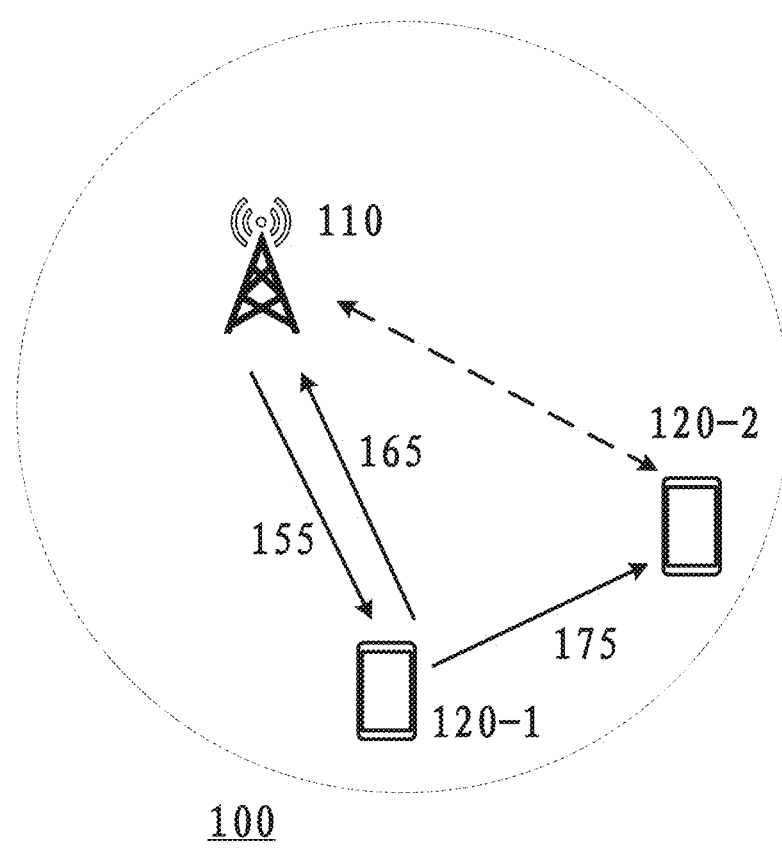
FIG. 1 illustrates an exemplary wireless communication system in which sidelink communication may take place according to an embodiment of the present disclosure.

FIG. 1 illustrates an exemplary wireless communication system in which sidelink communication may take place according to an embodiment. As shown in FIG. 1, a wireless communication system 100 includes a base station 110 and terminal devices 120-1 and 120-2. In the present disclosure, the terminal devices may be collectively referred to as a terminal device 120. The base station 110 and the terminal device 120-1 may be configured to be coupled to each other via a wireless link. Specifically, signaling and data may be transmitted between the base station 110 and the terminal device 120-1 via an uplink link 155 and a downlink link 165. The terminal device 120-1 and the terminal device 120-2 may be configured to be coupled to each other through a wireless link. Specifically, the terminal device 120-1 may transmit signaling and data to the terminal device 120-2 via a sidelink 175. Via the sidelink 175, the terminal device 120-1 may autonomously initiate transmission to the terminal device 120-2, or may relay transmission from the base station 110 to the terminal device 120-2. The sidelink 175 may support transmission from the terminal device 120-1 to the terminal device 120-2. In this sense, the terminal device 120-1 and the terminal device 120-2 may be referred to as a sending terminal device and a receiving terminal device respectively.

Optionally, an uplink/downlink (illustrated by a dashed line in FIG. 1) may be configured between the base station 110 and the terminal device 120-2, so that signaling and data can be transmitted therebetween. Optionally, the terminal device 120-2 may be located outside coverage of the base station 110 (not illustrated), and communicate with the terminal device 120-1 only via the sidelink 175.

The base station 110 may be configured to communicate with a network (for example, a core network of a cellular service provider, a telecommunications network such as a public switched telephone network (PSTN), and/or the Internet). In this way, the base station 110 can facilitate communication between the terminal devices 120 or between the terminal devices 120 and a network.

A base station herein has a full breadth of its general meaning, and includes at least a wireless communication station for communication that is part of a wireless communication system or a radio system. Examples of base stations may include, but are not limited to: at least one of a base transceiver station (BTS) and a base station controller (BSC) in a GSM system; at least one of a radio network controller (RNC) and a Node B in a WCDMA system; eNBs in LTE and LTE-Advanced systems; access points (APs) in WLAN and WiMAX systems; and corresponding network nodes in communication systems to be developed or under development (for example, an eLETeNB, a gNB in a 5G New Radio (NR) system, etc). Part of functions of a base station herein may also be implemented as an entity that has control functions on communication in the D2D, M2M, V2V and V2X communication scenarios, or as an entity that is used for spectrum coordination in the cognitive radio communication scenario.

A terminal herein has a full breadth of its general meaning, for example, a terminal may be a mobile station (MS), user equipment (UE), and the like. The terminal may be implemented as device such as a mobile phone, a handheld device, a media player, a computer, a laptop computer, a tablet computer, or a wireless device of nearly any type. In some cases, a terminal may communicate using multiple wireless communication technologies. For example, a terminal may be configured to communicate using two or more of GSM, UMTS, CDMA2000, LTE, LTE-Advanced, NR, WiMAX, WLAN, Bluetooth, and so on. In some cases, a terminal may alternatively be configured to communicate using only one wireless communication technology.

A number of base stations and terminal devices in FIG. 1 is just an example. Based on needs, the wireless communication system 100 may include more base stations and more terminal devices. It should be understood that, FIG. 1 illustrates only one of multiple arrangements of a wireless communication system, and embodiments of the present disclosure may be implemented in any appropriate layout based on needs.

Multiple resource allocation modes exist for allocating time-frequency resources for sidelink communication. For example, resource allocation may be performed by a base station or other scheduling devices, or resources may be perceived and selected by a sending terminal device. In the present disclosure, time-frequency resources can be allocated for sidelink communication based on multiple modes to form a candidate resource set. The sending terminal device can select a resource from the candidate resource set for sidelink communication. For example, the sending terminal device can perform selection based on attributes of time-frequency resources in the candidate resource set and/or a QoS requirement of sidelink communication. The selected time-frequency resources are not limited to resources allocated based on a certain allocation mode, but may include resources allocated based on one or more allocation modes, which can better meet the QoS requirement. In the resource allocation and selection solution according to the present disclosure, it is easier to achieve high reliability and low latency for sidelink communication, which is beneficial to a URLLC service.

Figure 2A:
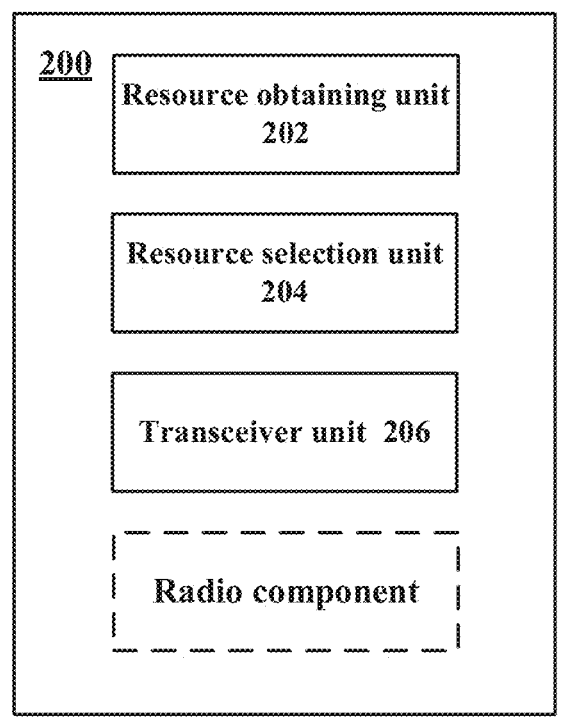
FIG. 2A illustrates an exemplary electronic device for a terminal device according to an embodiment of the present disclosure.

FIG. 2A illustrates an exemplary electronic device for a terminal device according to an embodiment. An electronic device 200 illustrated in FIG. 2A may include various units to implement various embodiment of the present disclosure. The electronic device 200 may include a resource obtaining unit 202, a resource selection unit 204, and a transceiver unit 206. In different implementations, the electronic device 200 may be implemented as the terminal device 120 in FIG. 1 or a part thereof. The various operations described below in connection with a terminal device can be implemented by the units 202 to 206 of the electronic device 200 or by other possible units.

Referring to the context of the wireless communication system 100 in FIG. 1, the electronic device 200 can be used for a sending terminal device (for example, 120-1). In the embodiment, the electronic device 200 supports multiple resource allocation modes, and can obtain time-frequency resources based on multiple allocation modes for communication with the receiving terminal device 120-2 via the sidelink 175. Specifically, the resource obtaining unit 202 of the electronic device 200 can be configured to search for time-frequency resources based on at least two allocation modes to obtain a candidate resource set. The candidate resource set may include time-frequency resources found based on multiple allocation modes.

The resource selection unit 204 of the electronic device 200 can be configured to select time-frequency resource(s) from the candidate resource set, which can be used for sidelink communication with a second terminal device. In an implementation, the selected time-frequency resource(s) may include a time-frequency resource obtained based on a first allocation mode (also referred to as corresponding to the first allocation mode) and/or a time-frequency resource obtained based on a second allocation mode (also referred to as corresponding to the second allocation mode).

The transceiver unit 206 of the electronic device 200 may be configured to notify the receiving terminal device (for example, 120-2) of the selected time-frequency resource(s) to be used for receiving sidelink communication from the sending terminal device. The transceiver unit 206 may be further configured to send resource selection information to a base station, and the resource selection information indicates whether a specified resource is selected.

Alternatively or additionally, the electronic device 200 may be used for a receiving terminal device (for example, 120-2). Correspondingly, the transceiver unit 206 may be configured to receive, from another terminal device, information on time-frequency resource(s) selected by the another terminal device, where the information on the time-frequency resource(s) is used for receiving sidelink communication from the another terminal device.

Figure 2B:
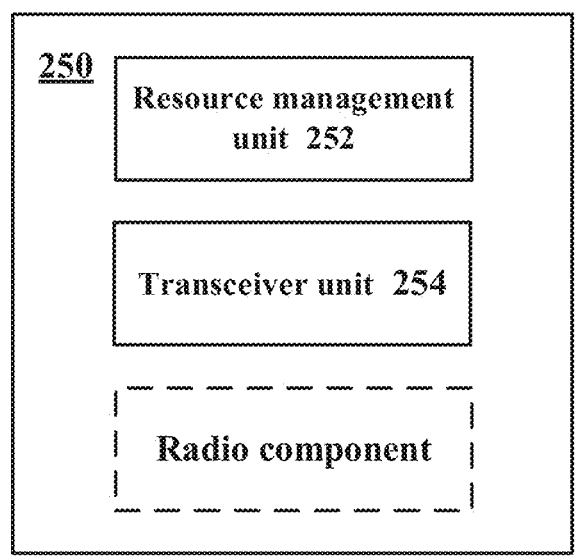
FIG. 2B illustrates an exemplary electronic device for a base station according to anembodiment of the present disclosure.

FIG. 2B illustrates an exemplary electronic device for a base station according to an embodiment. An electronic device 250 illustrated in FIG. 2A may include various units to implement various embodiment of the present disclosure. The electronic device 250 may include a resource management unit 252 and a transceiver unit 254. In different implementations, the electronic device 250 may be implemented as the base station 110 in FIG. 1 or a part thereof, or implemented as a device (for example, a base station controller) that controls the base station 110 or is related to the base station 110 by other means or a part of such device. The various operations described below in connection with a base station can be implemented by the units 252 to 254 of the electronic device 250 or by other possible units.

Referring to the context of the wireless communication system 100 in FIG. 1, in the embodiment, the resource management unit 252 of the electronic device 250 may be configured to receive a resource scheduling request message from the sending terminal device 120-1. The resource scheduling request message is used to request a time-frequency resource for sidelink communication between the sending terminal device 120-1 and the receiving terminal device 120-2. The resource management unit 252 may be further configured to allocate the time-frequency resource to the sending terminal device 120-1 based on a first allocation mode. The first allocation mode may include an allocation mode in which a base station grants a time-frequency resource to a terminal device, for example, allocation based on a resource scheduling request of the terminal device.

In an embodiment, the transceiver unit 254 of the electronic device 250 may be configured to send a resource grant message to the sending terminal device 120-1. The transceiver unit 254 may be further configured to receive resource selection information from the sending terminal device 120-1, where the resource selection information indicates whether the time-frequency resource corresponding to the first allocation mode is selected by the sending terminal device 120-1. The time-frequency resource, if not selected, may be allocated by the resource management unit 252 separately.

In an embodiment, the electronic devices 200 and 250 may be implemented at a chip level, or may be implemented at a device level by including another component (for example, a radio component indicated by a dashed line in figures). For example, each electronic device may work as a communication device in the form of an entire system.

It should be noted that the foregoing various units are only logical modules divided based on logical functions implemented by the units, and are not intended to limit specific implementations, for example, the units may be implemented by software, hardware, or a combination of software and hardware. In actual implementations, the foregoing various units may be implemented as independent physical entities, or may be implemented by a single entity (for example, a processor (CPU, DSP, or the like), or an integrated circuit). A processing circuit may refer to various implementations of a digital circuitry, an analog circuitry, or a mixed signal (a combination of analog and digital) circuitry that performs functions in a computing system. The processing circuit may include, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

The exemplary electronic devices according to the embodiments, as well as general operations are described above with reference to FIG. 2A and FIG. 2B. The following will further describe these operations in detail.

Figure 3:
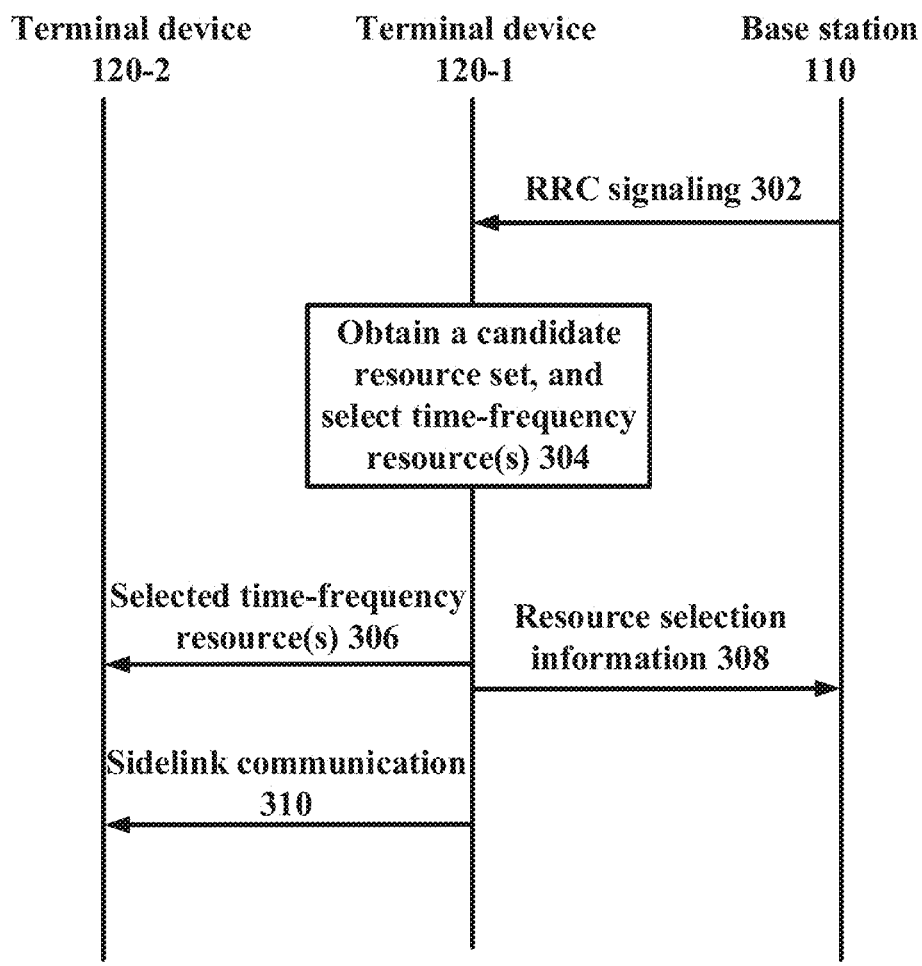
FIG. 3 illustrates an exemplary signaling flow for configuring and selecting time-frequency resources based on multiple allocation modes according to an embodiment of the present disclosure.

FIG. 3 illustrates an exemplary signaling flow for configuring and selecting time-frequency resources based on multiple allocation modes according to an embodiment. The selected time-frequency resources are used for communication between terminal devices via a sidelink. The signaling flow may be performed by the base station 110 and the terminal device 120.

As shown in FIG. 3, after a connection is established between the sending terminal device 120-1 and the base station 110, the base station 110 sends, at 302, parameter configuration information of different resource allocation modes to the sending terminal device 120-1 by using radio resource control (RRC) signaling (for example, RRC reconfiguration information). For example, the parameter configuration information may include resource pool information corresponding to different allocation modes preconfigured by the base station 110 and initialization information of sidelink communication (for example, Pcell information, a frequency of sidelink communication, and the like). In an embodiment, the base station 110 may send the parameter configuration information of multiple allocation modes to the first terminal device by using a broadcast message (for example, in SIB21 of an NR system). For example, at least part of the resource pool information corresponding to multiple allocation modes and the initialization information of the sidelink communication may be sent by using a broadcast message.

At 304, after receiving the parameter configuration information of multiple allocation modes, the terminal device 120-1 searches for time-frequency resources based on the multiple allocation modes to obtain a candidate resource set. The candidate resource set may include the time-frequency resources found based on the multiple allocation modes. The terminal device 120-1 further selects time-frequency resource(s) from the candidate resource set, which is used for sidelink communication with the terminal device 120-2. The candidate resource set includes the time-frequency resources found based on the multiple allocation modes, so the terminal device 120-1 can select time-frequency resource(s) that better meet a QoS requirement of the sidelink. The selected time-frequency resource(s) may include a time-frequency resource corresponding to the first allocation mode and/or a time-frequency resource corresponding to the second allocation mode.

At 306, after selecting time-frequency resource(s), the terminal device 120-1 notifies the terminal device 120-2 of the selected time-frequency resource(s) to be used for sidelink communication with the terminal device 120-2. For example, specific time-frequency resource information or index may be transmitted by using sidelink control information to notify the terminal device 120-2 of the selected time-frequency resource(s). At 308, the terminal device 120-1 also sends resource selection information to the base station 110, and the resource selection information indicates whether a specified resource is selected.

At 310, the terminal device 120-1 communicates with the terminal device 120-2 via a sidelink by using the selected time-frequency resource(s). For example, in a NR system, communication can be performed through a physical sidelink share channel (Physical Sidelink Share Channel, PSSCH).

Obtaining a Candidate Resource Set Based on Multiple Allocation Modes

The present disclosure relates to multiple resource allocation modes for sidelink communication. A first allocation mode may include scheduling and granting, by a base station, a time-frequency resource to a sending terminal device. For example, scheduling may be performed based on a resource scheduling request of the sending terminal device.

Figure 4:
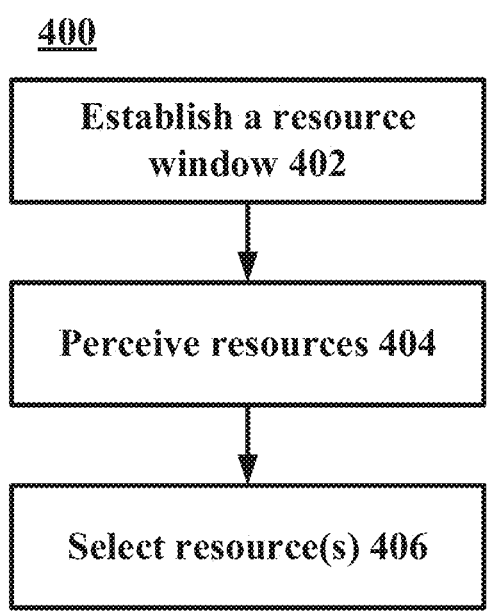
FIG. 4 illustrates exemplary operations of a second allocation mode according to an embodiment of the disclosure.

A second allocation mode may include perceiving and searching for a time-frequency resource by the sending terminal device. FIG. 4 illustrates exemplary operations of a second allocation mode according to an embodiment. As shown in FIG. 4, an operation 400 includes 402, at which a resource window is established. The resource window may be a time window of a certain duration. The operation 400 includes 404, at which resource perception is performed in the resource window. A terminal device may perceive a preconfigured frequency resource. For example, a terminal device may obtain a preconfigured frequency resource based on parameter configuration information of the resource allocation mode from a base station.

Resource perception is intended to obtain a time-frequency resource that can be used by a sending terminal device. Resource perception can be performed in any way. For example, a sending terminal device may receive and decode sidelink control information (for example, sidelink control information (SCI) in an NR system). Therefore, the sending terminal device can rule out the time-frequency resources that have been explicitly allocated in the SCI. For another example, a sending terminal device can measure preconfigured frequency resources in the frequency domain in the resource window (for example, measuring RSRP, RSRQ, SNR, SNIR, and the like). Therefore, the sending terminal device can rule out the frequency resources, of which a measured value is greater than a preset threshold.

Based on a resource perception result at 404, the sending terminal device can obtain a time-frequency resource set that can be used. At 406, the sending terminal device can select a desired time-frequency resource from the time-frequency resource set. For example, the selection may be performed randomly or based on a measured value in the frequency domain.

In the second allocation mode, the sending terminal device may select a time-frequency resource from preconfigured resources, instead of scheduling resources exclusively by another device. Therefore, the sending terminal device can obtain a time-frequency resource quickly. In the case of low channel usage, it is of a high success rate for the sending terminal device to quickly obtain a time-frequency resource. To a certain extent, the second allocation mode can help reduce latency and improve reliability of sidelink communication, which is beneficial to services such as an ultra-reliable and low latency communication (URLLC) service.

A third allocation mode may include: requesting, by a sending terminal device, to a resource scheduling device for a time-frequency resource and allocating, by the resource scheduling device, the time-frequency resource to the sending terminal device. The resource scheduling device may be another entity except a base station, and is configured to allocate time-frequency resources to terminal devices in a cluster for sidelink communication. The base station may pre-allocate a resource pool to the resource scheduling device, so that the resource scheduling device can further allocate resources to terminal devices.

Figure 5:
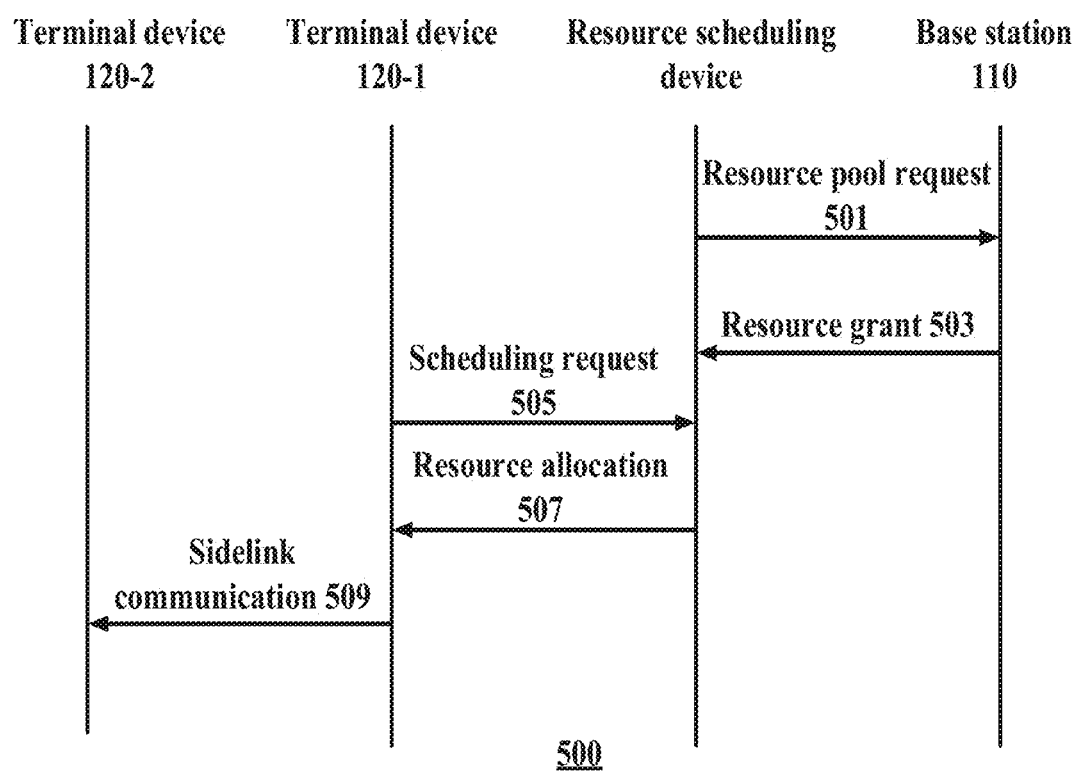
FIG. 5 illustrates exemplary operations of a third allocation mode according to an embodiment of the disclosure.

FIG. 5 illustrates exemplary operations of a third allocation mode according to an embodiment. As shown in FIG. 5, an operation 500 includes 501, at which the resource scheduling device sends a resource pool scheduling request message to the base station 110, so as to request the base station 110 to allocate a resource pool for the resource scheduling device to further allocate to terminal devices in the cluster for sidelink communication. At 503, the base station grants a resource pool to the resource scheduling device based on the resource request, and the resource scheduling device receives a resource pool grant message from the base station 110. At 505, the terminal device 120-1 can serve as a member of the cluster and send a scheduling request to the resource scheduling device to request resources for sidelink communication. At 507, in response to the resource scheduling request message from the terminal device 120-1, the resource scheduling device may select a time-frequency resource from the resource pool, so as to grant the resource to the terminal device 120-1. In an embodiment, the scheduling request may include parameter configuration information of the third allocation mode, which is preconfigured for the terminal device 120-1 by the base station. Alternatively, the resource scheduling device may be aware of the parameter configuration information in advance, so that the resource scheduling device can allocate a time-frequency resource to the terminal device 120-1 based on the parameter configuration information. At 509, the allocated time-frequency resource can be used by the terminal device 120-1 for sidelink communication with the terminal device 120-2.

In an embodiment, the resource scheduling device may be any device except a base station, for example, one of terminal devices in a cluster. Compared with a base station, the resource scheduling device is closer to the cluster of terminal devices, so resource usage in a local area can be better perceived, which facilitates multicast communication. For example, the resource scheduling device can perceive the usage of resources in the cluster by referring to the resource perception operation 404 described in FIG. 4. Alternatively, the resource scheduling device can gather the perception result of each terminal device and analyze resource usage, so as to allocate appropriate time-frequency resources to terminal devices with a low latency. Therefore, compared with the first allocation mode, the third allocation mode can better reduce latency of sidelink communication and improve reliability, meeting a QoS requirement of services such as URLLC services.

Selecting a Time-Frequency Resource

In the present disclosure, a sending terminal device may search for time-frequency resources based on at least two allocation modes. The at least two allocation modes may include a first allocation mode, a second allocation mode, and/or another possible allocation mode. For the first allocation mode, the sending terminal device may send a resource scheduling request message to a base station and receive a resource grant message from the base station. For the second allocation mode, the sending terminal device may perceive and search for a time-frequency resource. Correspondingly, a candidate resource set at least includes time-frequency resources corresponding to the first and second allocation modes.

The at least two allocation modes may include a first allocation mode, a third allocation mode, and/or another possible allocation mode. For the first allocation mode, the sending terminal device may send a resource scheduling request message to a base station and receive a resource grant message from the base station. For the third allocation mode, the sending terminal device may send a resource scheduling request message to a cluster scheduling device and receive a resource grant message from the cluster scheduling device. Correspondingly, the candidate resource set at least includes time-frequency resources corresponding to the first and third allocation modes.

The at least two allocation modes may include a second allocation mode, a third allocation mode, and/or another possible allocation mode. For the second allocation mode, the sending terminal device may perceive and search for a time-frequency resource. For the third allocation mode, the sending terminal device may send a resource scheduling request message to a cluster scheduling device and receive a resource grant message from the cluster scheduling device. Correspondingly, the candidate resource set at least includes time-frequency resources corresponding to the second and third allocation modes.

After obtaining the candidate resource set, the sending terminal device may select a time-frequency resource based on a QoS requirement of sidelink communication and an attribute of a time-frequency resource in the candidate resource set. In an embodiment, time-frequency resource(s) corresponding to one or more allocation modes may be selected.

Figure 6:
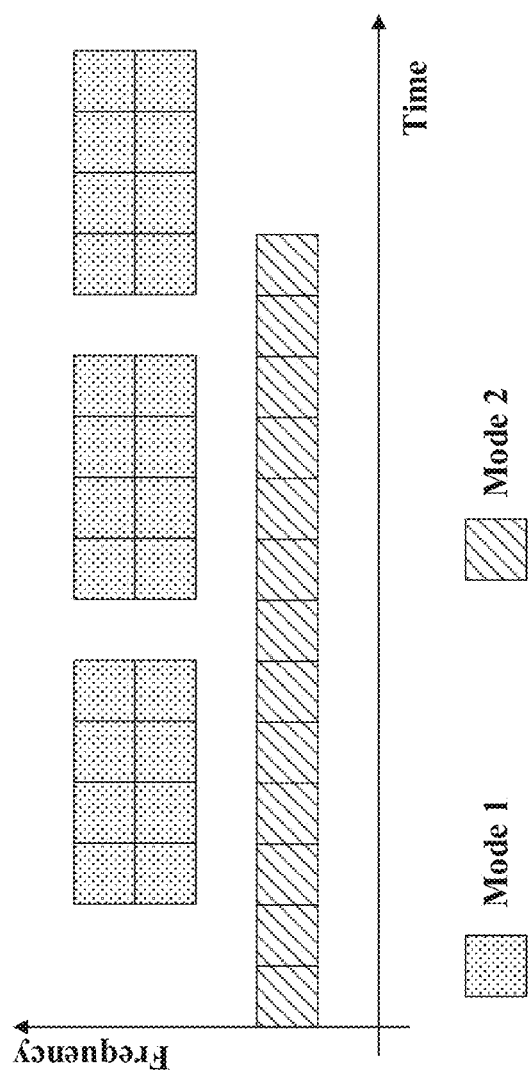
FIG. 6 is a schematic diagram of selecting a time-frequency resource according to an embodiment of the present disclosure.

FIG. 6 is a schematic diagram of selecting a time-frequency resource according to an embodiment. FIG. 6 illustrates a candidate resource set of time-frequency resources corresponding to two allocation modes (namely mode 1 and mode 2). The case in which the candidate resource set includes time-frequency resources corresponding to more allocation modes can be similarly understood.

In the candidate resource set, time-frequency resources corresponding to different allocation modes may have different attributes. As shown in FIG. 6, time-frequency resources corresponding to mode 1 is later than time-frequency resources corresponding to mode 2 in terms of time, for example, two OFDM symbols later. The time-frequency resources corresponding to mode 1 (for example, with a width of two subcarriers) are more than the time-frequency resources corresponding to mode 2 (for example, with a width of one subcarrier) in the frequency domain. The time-frequency resources corresponding to mode 1 are discrete in the time domain, and the time-frequency resources corresponding to mode 2 are continuous in the time domain. The time-frequency resources corresponding to mode 1 may be superior to the time-frequency resources corresponding to mode 2 in performance, or vice versa. Alternatively, part of the time-frequency resources corresponding to mode 1 are superior to the time-frequency resources corresponding to mode 2 in performance.

Sidelink communication may have different QoS requirements. For example, a URLLC service expects low latency and high reliability, and other services may expect resources that are relatively wide in the frequency domain or resources that are continuous in the time domain. Correspondingly, the sending terminal device may select matching time-frequency resources for different services.

For example, time-frequency resources may be selected based on a sequence of resources in the time domain. The resources corresponding to mode 2 are earlier in the time domain, so these resources can be selected for a URLLC service to reduce the wait delay. For example, time-frequency resources may be selected based on resource performance. A resource with better performance (for example, less interference) may be selected from all the resources corresponding to mode 1 and mode 2, and such resource can be selected for a URLLC service to improve reliability.

It can be understood that mode 1 or mode 2 may correspond to any one of the foregoing first to third allocation modes. A candidate resource set including time-frequency resources corresponding to different allocation modes allows a sending terminal device to select a resource for sidelink communication in a flexible way, making it easier for the sending terminal device to select a time-frequency resource that meets the QoS requirement of a service. FIG. 6 illustrates merely an example of resource selection. It can be understood that relative performance of resources allocated based on different modes are uncertain. However, the sending terminal device can select an appropriate resource (which may be allocated based on one or more modes) from the candidate resource set for sidelink communication.

In the resource allocation and selection solution according to the present disclosure, it is easier to achieve high reliability and low latency for sidelink communication, which is beneficial to a URLLC service. For example, in the case of high channel usage or serious channel interference, the technical solution according to the present disclosure has obvious advantages over resource allocation based on a single mode. For example, the technical solution according to the present disclosure is beneficial in supporting URLLC services in more extensive scenarios.

Figure 7:
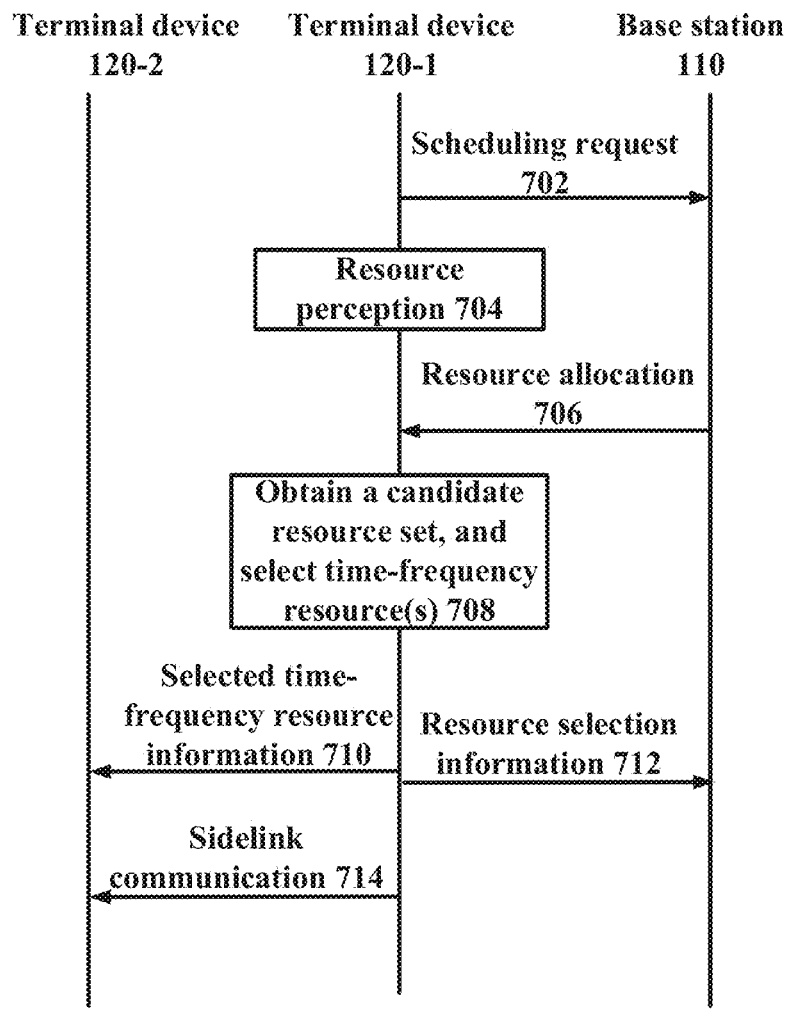
FIG. 7 illustrates an exemplary signaling flow for selecting time-frequency resources based on two allocation modes according to an embodiment of the present disclosure.

FIG. 7 illustrates an exemplary signaling flow for selecting time-frequency resources based on two allocation modes according to an embodiment. The selected time-frequency resources are used for sidelink communication between terminal devices. The two allocation modes correspond to the first allocation mode and the second allocation mode respectively. The signaling flow may be performed by the base station 110 and the terminal device 120.

As described with reference to FIG. 3, after a connection is established between the terminal device 120 and the base station 110, the base station 110 sends parameter configuration information of different resource allocation modes to the terminal device 120 by using RRC signaling. Based on such parameter configuration information, the terminal device 120 can obtain and select a time-frequency resource for sidelink communication. As shown in FIG. 7, based on a requirement of sidelink communication with the terminal device 120-2, the terminal device 120-1 sends a resource scheduling request message to the base station 110 at 702, and performs resource perception at 704. At 706, in response to the resource scheduling request message from the terminal device 120-1, the base station 110 may select a time-frequency resource from a resource pool, so as to grant the resource to the terminal device 120-1. Resource perception at 704 may include perceiving, by the terminal device 120-1, preconfigured frequency resources in a resource window. Relying on resource perception, the terminal device 120-1 can rule out the time-frequency resources that have been explicitly allocated in the SCI and/or rule out the time-frequency resources that have been used as suggested by a measured value. The terminal device 120-1 can also obtain time-frequency resources by means of resource perception, so a resource scheduling request message can be sent to the base station 110 in a manner in which requirements in the request can be lower than actual requirements of sidelink communication. In some embodiments, this manner may help the base station 110 grant time-frequency resources to the terminal device 120-1 more quickly or at a higher success rate.

At 708, the terminal device 120-1 obtains a candidate resource set. The candidate resource set includes the time-frequency resources found based on the first and second allocation modes. The terminal device 120-1 further selects time-frequency resource(s) from the candidate resource set, which can be used for sidelink communication with the terminal device 120-2. The candidate resource set includes the time-frequency resources found based on multiple allocation modes, so the terminal device 120-1 can select time-frequency resource(s) that better meet a QoS requirement of the sidelink, as described with reference to FIG. 6.

At 710, after selecting the time-frequency resource(s), the terminal device 120-1 notifies the terminal device 120-2 of the selected time-frequency resource to be used for sidelink communication with the terminal device 120-2. For example, specific time-frequency resource information or index may be transmitted by using sidelink control information to notify the terminal device 120-2 of the selected time-frequency resource. At 712, the terminal device 120-1 also sends resource selection information to the base station 110, and the resource selection information indicates whether a specified resource is selected.

At 714, the terminal device 120-1 communicates with the terminal device 120-2 via a sidelink by using the selected time-frequency resource(s).

Figure 8:
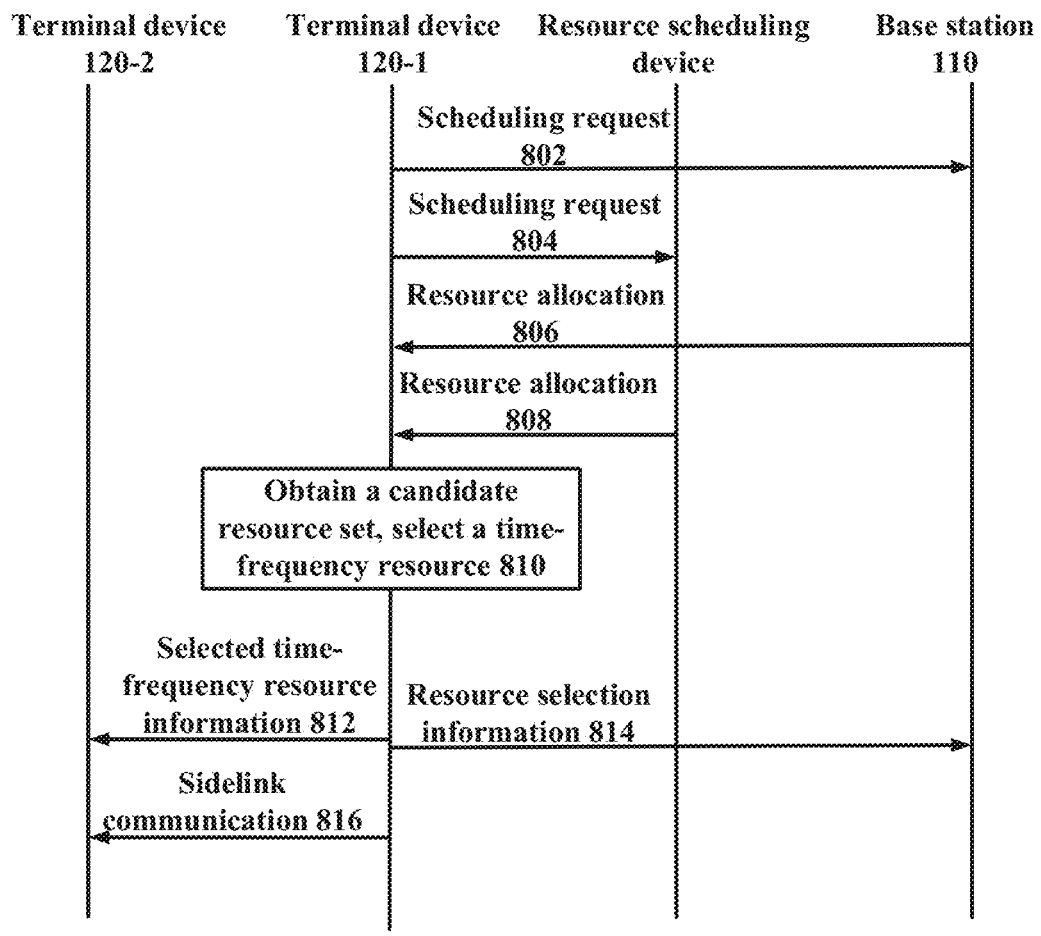
FIG. 8 illustrates another exemplary signaling flow for selecting time-frequency resources based on two allocation modes according to an embodiment of the present disclosure.

FIG. 8 illustrates another exemplary signaling flow for selecting time-frequency resources based on two allocation modes according to an embodiment. The selected time-frequency resources are used for sidelink communication between terminal devices. The two allocation modes correspond to the first allocation mode and the third allocation mode respectively. The signaling flow may be performed by the base station 110, the terminal device 120, and a resource scheduling device.

As shown in FIG. 8, based on a requirement of sidelink communication with the terminal device 120-2, the terminal device 120-1 sends a resource scheduling request message to the base station 110 at 802, and sends another resource scheduling request message to the resource scheduling device at 804. At 806, in response to the resource scheduling request message from the terminal device 120-1, the base station 110 may select a time-frequency resource from a resource pool, so as to grant the resource to the terminal device 120-1. At 808, in response to the resource scheduling request message from the terminal device 120-1, the resource scheduling device may select a time-frequency resource from the resource pool, so as to grant the resource to the terminal device 120-1. The terminal device 120-1 can obtain time-frequency resources from multiple sources, so a resource scheduling request message can be sent to the base station 110 or the resource scheduling device in a manner in which requirements in the request can be lower than actual requirements of sidelink communication. In some embodiments, this manner may help the base station 110 or the resource scheduling device grant time-frequency resources to the terminal device 120-1 more quickly or at a higher success rate.

At 810, the terminal device 120-1 obtains a candidate resource set. The candidate resource set includes the time-frequency resources found based on the first and third allocation modes. The terminal device 120-1 further selects time-frequency resource(s) from the candidate resource set, which can be used for sidelink communication with the terminal device 120-2. The candidate resource set includes the time-frequency resources found based on multiple allocation modes, so the terminal device 120-1 can select time-frequency resource(s) that better meet a QoS requirement of the sidelink, as described with reference to FIG. 6.

At 812, after selecting time-frequency resource(s), the terminal device 120-1 notifies the terminal device 120-2 of the selected time-frequency resource(s) to be used for sidelink communication with the terminal device 120-2. At 814, the terminal device 120-1 also sends resource selection information to the base station 110, and the resource selection information indicates whether a specified resource is selected.

At 816, the terminal device 120-1 communicates with the terminal device 120-2 via a sidelink by using the selected time-frequency resource.

Figure 9A:
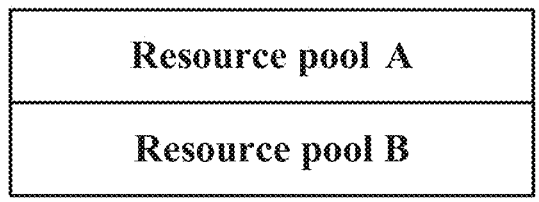
FIG. 9A and FIG. 9B are schematic diagrams of resource pools for multiple allocation modes according to an embodiment of the present disclosure.
Figure 9B:
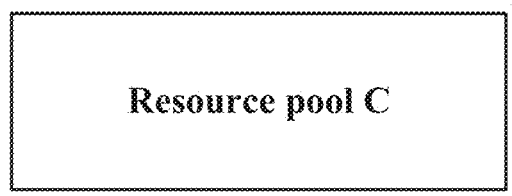

FIG. 9A and FIG. 9B are schematic diagrams of resource pools for multiple allocation modes according to an embodiment. In the example illustrated by FIG. 9A, different resource allocation modes may correspond to different resource pools. Taking two allocation modes as an example, resource pool A may correspond to the first allocation mode, and resource pool B may correspond to the second or third allocation mode. Similarly, three resource pools may be configured for three allocation modes separately. Two resource pools may be configured for three allocation modes, for example, the second and third allocation modes may correspond to one resource pool. In the example illustrated by FIG. 9B, different resource allocation modes may correspond to the same pool. For example, resource pool C may correspond to a combination of at least two of the first to the third allocation modes.

It should be understood that a resource pool represents a collection of specified time-frequency resources, but does not constitute any limitation on resources in the time domain or frequency domain. To the contrary, resources in a single resource pool may be continuous or discrete in the time domain or frequency domain. Taking an NR system as an example, resources in a single resource pool may correspond to one or more bandwidth parts (BWPs), and resources in multiple resource pools may correspond to the same or different BWPs. The sending and receiving terminal devices 120 can report device capabilities to the base station 110 to activate resources in multiple resource pools or multiple BWPs. For example, if one or more resource pools are in the same BWP, the BWP and one or more resource pools in the BWP are activated; if one or more resource pools are in multiple BWPs, the multiple BWPs and corresponding resource pools are activated.

Resource Selection Notification

In the present disclosure, after a time-frequency resource is selected for sidelink communication, the sending terminal device may transmit specific time-frequency information or index by using sidelink control information (for example, SCI in an NR system) to notify the receiving terminal device 120-2 of the selected time-frequency resource. In a NR system, SCI may be transmitted through a physical sidelink control channel (PSSCH).

In an embodiment, a time-frequency resource field in the SCI can be used to directly indicate a resource location. In another embodiment, a resource pool index field, for example, ResourceIndex (shown in Table 1), can be added to the SCI to indicate a specified resource pool. The time-frequency resource field in the SCI can be used to indicate the specific location of a time-frequency resource in the specific resource pool. The resource pool index field and the time-frequency resource field may also uniquely indicate a time-frequency resource for sidelink communication.

In the latter manner, a number of bits required to indicate a time-frequency resource in a specified resource pool is smaller than a number of bits required to indicate a time-frequency resource in all resources in the former manner. That is, signaling overhead used for notifying a selected resource can be reduced by using an index value to indicate a resource pool. Correspondingly, the base station 110 can preconfigure a mapping between multiple resource pools and index values for the terminal device 120 by using RRC signaling.

TABLE 1

| ResourceIndex field description |
| --- |
| ResourceIndex Indicates a specified resource block |

Resource Selection Reporting

In the present disclosure, after a time-frequency resource is selected for sidelink communication, the sending terminal device may transmit resource selection information through a physical uplink control channel (PUCCH) to notify the base station of the selected time-frequency resource. In an NR system, uplink control information (UCI) may carry the resource selection information. The resource selection information can indicate to the base station the resource selected for sidelink communication. For example, the resource selection information may indicate whether the time-frequency resource corresponding to the first allocation mode (allocated by the base station) is selected, or may also indicate a specific time-frequency resource selected from the time-frequency resources corresponding to any allocation mode.

In an embodiment, a first indicator on the PUCCH channel may be used to indicate whether the time-frequency resource corresponding to the first allocation mode is selected. The first indicator may be of only one bit. Specifically, a value of the indicator being 0 may indicate that a time-frequency resource is not selected, and a value of the indicator being 1 may indicate that a time-frequency resource is selected. In an embodiment, an existing UCI field may be used to carry the 1-bit indicator to reduce UCI overhead. For example, the existing UCI field includes an ACK/NACK field for HARQ feedback.

In an embodiment, a terminal device may prefer to select a time-frequency resource corresponding to the first allocation mode. For example, a reason is that the time-frequency resource corresponding to the first allocation mode has a higher priority. Correspondingly, only the first indicator with a value of 0 may be sent. When the time-frequency resource corresponding to the first allocation mode is selected, the first indicator is not sent. In another embodiment, a terminal device may prefer to select a time-frequency resource corresponding to another allocation mode. For example, a reason is that the time-frequency resource corresponding to the first allocation mode has a lower priority. Correspondingly, only the first indicator with a value of 1 may be sent. When the time-frequency resource corresponding to the first allocation mode is not selected, the first indicator is not sent.

Upon being notified a result of whether the resource allocated by the base station is selected by the sending terminal device, the base station may perform further resource scheduling based on the resource selection information. For example, the base station may release the time-frequency resource that is allocated to but not selected by the sending terminal device, so as to avoid resource conflicts in subsequent resource scheduling.

In an embodiment, a second indicator on the PUCCH channel may be used to indicate a specific time-frequency resource selected from the time-frequency resources corresponding to any allocation mode. The second indicator may correspond to multiple bits. A corresponding number of bits may be used to describe the frequency domain and the time domain of the specific time-frequency resource. The corresponding number of bits may be related to the following factors: a number of sidelink subchannels and a maximum number of resources that can be reserved for the sidelink. Of course, a corresponding index value may be preconfigured for a specific time-frequency resource, for example, by using RRC signaling Alternatively, an index value may be used to describe a specific time-frequency resource. FIG. 10 illustrates an exemplary format of a second indicator used to indicate a time-frequency resource according to an embodiment. In FIG. 10, the parameter $N_{subchannel}^{SL}$ indicates the number of sidelink subchannels, and the parameter sl-MaxNumPerReserve indicates the maximum number of resources that can be reserved for sidelink. The foregoing parameters may be configured by using upper-layer signaling (for example, RRC signaling).

The second indicator can help the base station acquire detailed information of resource selection, so as to release a resource not selected and avoid resource conflicts in further resource scheduling.

Figure 11:
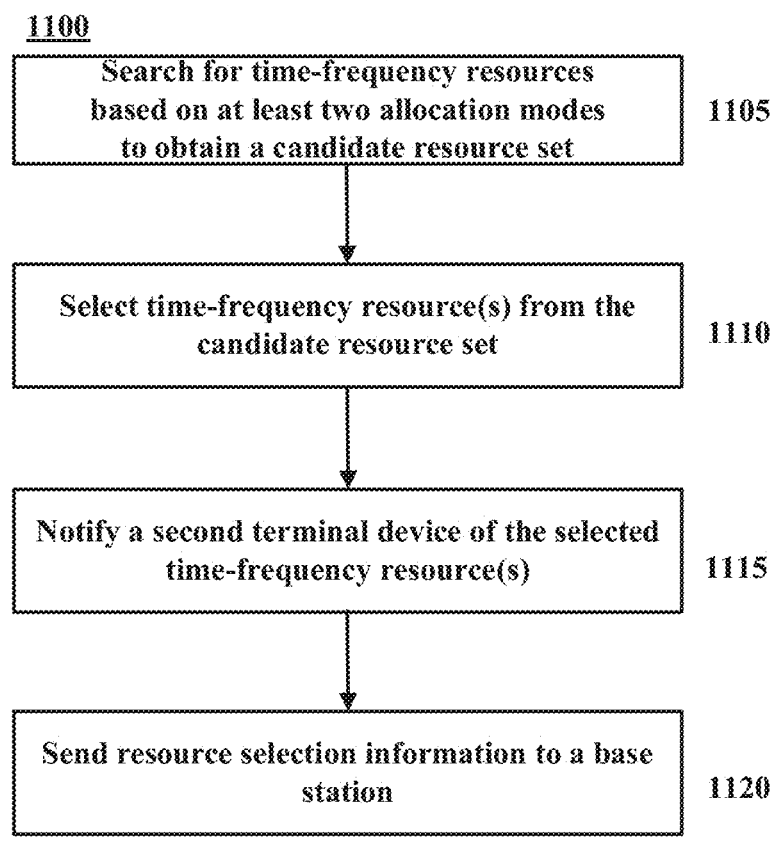
FIG. 11 illustrates an exemplary method for wireless communication according to an embodiment of the present disclosure.

FIG. 11 illustrates an exemplary method for wireless communication according to an embodiment. A method 1100 may be performed by a sending terminal device 120-1 for sidelink communication with a receiving terminal device 120-2. As shown in FIG. 11, the method 1000 may include searching for time-frequency resources based on at least two allocation modes to obtain a candidate resource set (block 1105) and selecting time-frequency resource(s) from the candidate resource set (block 1110). The method may further include notifying the receiving terminal device 120-2 of the selected time-frequency resource to be used for sidelink communication with the receiving terminal device 120-2 (block 1115). The method may further include sending resource selection information to a base station 110, and the resource selection information may indicate how resources are selected, for example, whether a specified resource is selected (block 1120).

In an embodiment, the searching for time-frequency resources based on at least two allocation modes includes: for a first allocation mode, sending a resource scheduling request message to the base station 110, and receiving a resource grant message from the base station 110; and perceiving and searching for a time-frequency resource based on a second allocation mode. The candidate resource set may include time-frequency resources corresponding to the first and second allocation modes.

In an embodiment, the perceiving and searching for a time-frequency resource for the second allocation mode includes perceiving resources in a resource window and selecting a desired resource based on a perception result.

In an embodiment, the searching for time-frequency resources based on at least two allocation modes includes: for a first allocation mode, sending a resource scheduling request message to the base station 110, and receiving a resource grant message from the base station 110; and for a third allocation mode, sending a resource scheduling request message to a cluster scheduling device, and receiving a resource grant message from the cluster scheduling device. The candidate resource set may include time-frequency resources corresponding to the first and third allocation modes.

In an embodiment, the sending terminal device 120-1 is used as a resource scheduling device, and the method 1100 further includes: sending a resource pool scheduling request message to the base station 110, and receiving a resource pool grant message from the base station 110; and in response to a resource scheduling request message from a specified terminal device, selecting a time-frequency resource from the resource pool, so as to provide grant for the specified terminal device.

In an embodiment, selecting a time-frequency resource includes selecting a time-frequency resource based on a QoS requirement of sidelink communication and attributes of time-frequency resources in the candidate resource set, where a time-frequency resource corresponding to one or more allocation modes is selected.

In an embodiment, the resource selection information indicates, to the base station 110, whether the time-frequency resource corresponding to the first allocation mode is selected.

In an embodiment, the resource selection information further indicates, to the base station 110, the selected time-frequency resource(s) from those corresponding to the second or third allocation mode.

In an embodiment, the method 1100 further includes receiving, from the base station, parameter configurations of the at least two allocation modes by using RRC signaling.

In an embodiment, the method 1100 further includes receiving, from another terminal device, information on a time-frequency resource selected by the another terminal device, where the information on the time-frequency resource is used for receiving sidelink communication from the another terminal device.

In an embodiment, the method 1100 further includes transmitting specific time-frequency resource information or index by using sidelink control information to notify the terminal 120-2 device of the selected time-frequency resource(s).

Figure 12:
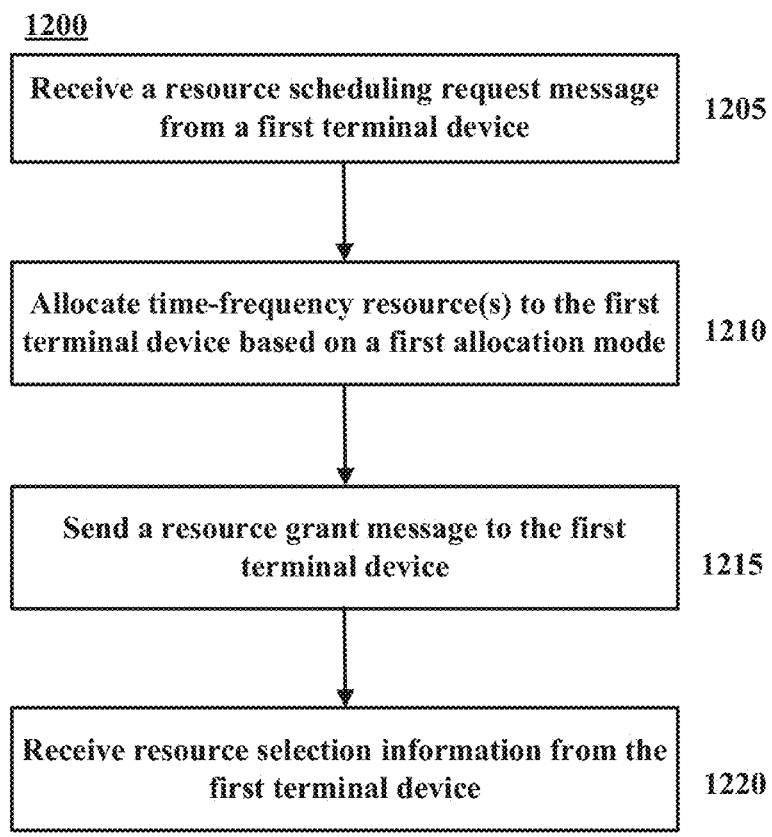
FIG. 12 illustrates another exemplary method for wireless communication according to an embodiment of the present disclosure.

FIG. 12 illustrates an exemplary method for wireless communication according to an embodiment. The method 1200 may be performed by a base station 110 to allocate a time-frequency resource for sidelink communication between terminal devices 120. As show in FIG. 12, the method 1200 may include receiving a resource scheduling request message from a sending terminal device 120-1. The resource scheduling request message is used to request a time-frequency resource for sidelink communication between the sending terminal device 120-1 and the receiving terminal device 120-2. The method 1200 may further include allocating the time-frequency resource to the sending terminal device 120-1 based on a first allocation mode and sending a resource grant message to the sending terminal device 120-1. The method 1200 may further include receiving resource selection information from the sending terminal device 120-1, where the resource selection information indicates whether the time-frequency resource corresponding to the first allocation mode is selected by the sending terminal device 120-1.

In an embodiment, the resource selection information further indicates a time-frequency resource selected by the terminal device 120-1 from time-frequency resource(s) corresponding to at least another one allocation mode.

In an embodiment, the method 1200 further includes sending, to the terminal device 120-1, parameter configurations of the first allocation mode and the at least another one allocation mode by using RRC signaling.

In an embodiment, the method 1200 further includes performing further resource allocation based on the resource selection information, for example, releasing the time-frequency resource that is granted but not selected.

Various exemplary electronic devices and methods according to the embodiments of the present disclosure have been described above. It should be understood that the operations or functions of these electronic devices may be combined with each other to achieve more or less operations or functions than described. The operation steps of the methods may also be combined with each other in any appropriate order, so that more or fewer operations are similarly achieved than described.

It should be understood that the machine-executable instructions in the machine-readable storage medium or program product according to the embodiments of the present disclosure may be configured to perform operations corresponding to the device and method embodiments described above. When referring to the above device and method embodiments, the embodiments of the machine-readable storage medium or the program product are clear to those skilled in the art, and therefore description thereof will not be described herein again. A machine-readable storage media and a program product for carrying or including the above-described machine-executable instructions also fall within the scope of the present disclosure. Such storage medium can include, but is not limited to, a floppy disk, an optical disk, a magneto-optical disk, a memory card, a memory stick, and the like. In addition, it should be understood that the foregoing series of processing and devices may alternatively be implemented by software and/or firmware.

Figure 13:
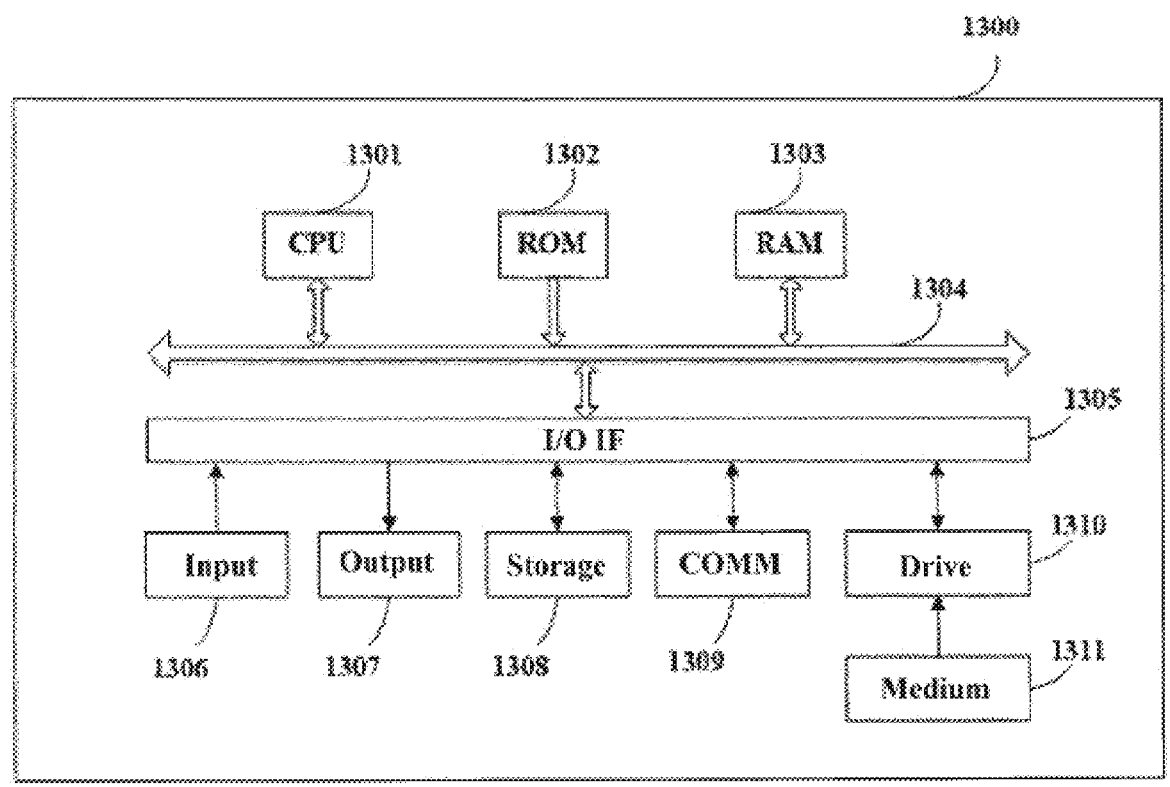
FIG. 13 is a block diagram illustrating an exemplary structure of a personal computer as an information processing device that can be used in an embodiment of the present disclosure.

In addition, it should be understood that the foregoing series of processing and devices may alternatively be implemented by software and/or firmware. In the case that the processing and devices are implemented by software and/or firmware, a program constituting the software is installed from a storage medium or a network to a computer with a dedicated hardware structure, for example, a universal personal computer 1300 shown in FIG. 13. When installed with various programs, the computer can perform various functions. FIG. 13 is a block diagram illustrating an exemplary structure of a personal computer as an information processing device that can be used in an embodiment of the present disclosure. In an example, the personal computer may correspond to the foregoing exemplary terminal device according to the present disclosure.

In FIG. 13, a central processing unit (CPU) 1301 executes various processing based on a program stored in a read-only memory (ROM) 1302 or a program loaded from a storage part 1308 to a random access memory (RAM) 1303. The RAM 1303 also stores data required for the CPU 1301 to execute various processing and the like when necessary.

The CPU 1301, the ROM 1302, and the RAM 1303 are connected with each other via a bus 1304. An input/output port 1305 is also connected to the bus 1304.

The following components are connected to the input/output port 1305: an input part 1306, including a keyboard, a mouse, and the like; an output part 1307, including a display such as a cathode-ray tube (CRT) and a liquid crystal display (LCD), a speaker, and the like; a storage part 1308, including a hard disk and the like; and a communication part 1309, including a network interface card such as a LAN card, a modem, and the like. The communication part 1309 performs communication processing via a network such as the Internet.

Based on needs, a drive 1310 is also connected to the input/output port 1305. A removable medium 1311 such as a magnetic disk, an optical disk, a magneto-optical disk, a semiconductor memory, or the like is mounted on the drive 1310 when necessary, so that a computer program read therefrom is installed in the storage part 1308 when necessary.

In the case that the foregoing series of processing are implemented by software, programs constituting the software are installed from a network such as the Internet or a storage medium such as the removable medium 1311.

Those skilled in the art should understand that such a storage medium is not limited to the removable medium 1311 shown in FIG. 13, in which the program is stored and distributed independent from a device to provide the program for users. For example, the removable medium 1311 includes a magnetic disk (including a floppy disk (registered trademark)), an optical disk (including a compact disk read-only memory (CD-ROM) and a digital versatile disk (DVD)), a magneto-optical disk (including a mini disk (MD)(registered trademark)), and a semiconductor memory. Alternatively, the storage medium may be the ROM 1302, a hard disk included in the storage part 1308, or the like, in which the program is stored, and will be distributed to users together with a device including it.

The technology of the present disclosure can be applied to various products. For example, the base stations mentioned in this disclosure may be implemented as any type of evolved Node B (gNB), such as a macro gNB and a small gNB. The small gNB may be a gNB covering a cell smaller than the macro cell, such as a pico gNB, a micro gNB, and a home (femto) gNB. Alternatively, the base station may be implemented as any other type of base station, such as a NodeB and a Base Transceiver Station (BTS). The base station may include: a body (also referred to as a base station device) configured to control radio communication; and one or more remote radio heads (RRHs) disposed at a different location from the body. In addition, various types of terminals which will be described below can operate as a base station independently by performing base station functions temporarily or semi-persistently.

For example, the terminal device mentioned in the present disclosure, also referred to as user equipment in some examples, may be implemented as a mobile terminal (such as a smartphone, a tablet personal computer (PC), a notebook PC, a portable game terminal, a portable/dongle type mobile router and a digital camera), or an in-vehicle terminal (such as a car navigation device). The user equipment may also be implemented as a terminal that performs machine-to-machine (M2M) communication (also referred to as a machine type communication (MTC) terminal). Further, the user equipment may be a radio communication module (such as an integrated circuit module including a single wafer) installed on each of the foregoing terminals.

Use cases according to the present disclosure will be described below with reference to FIGS. 14 to 17.

[Use Cases Regarding a Base Station]

An exemplary configuration of a gNB is described below with reference to FIG. 14 and FIG. 15.

First Use Case

Figure 14:
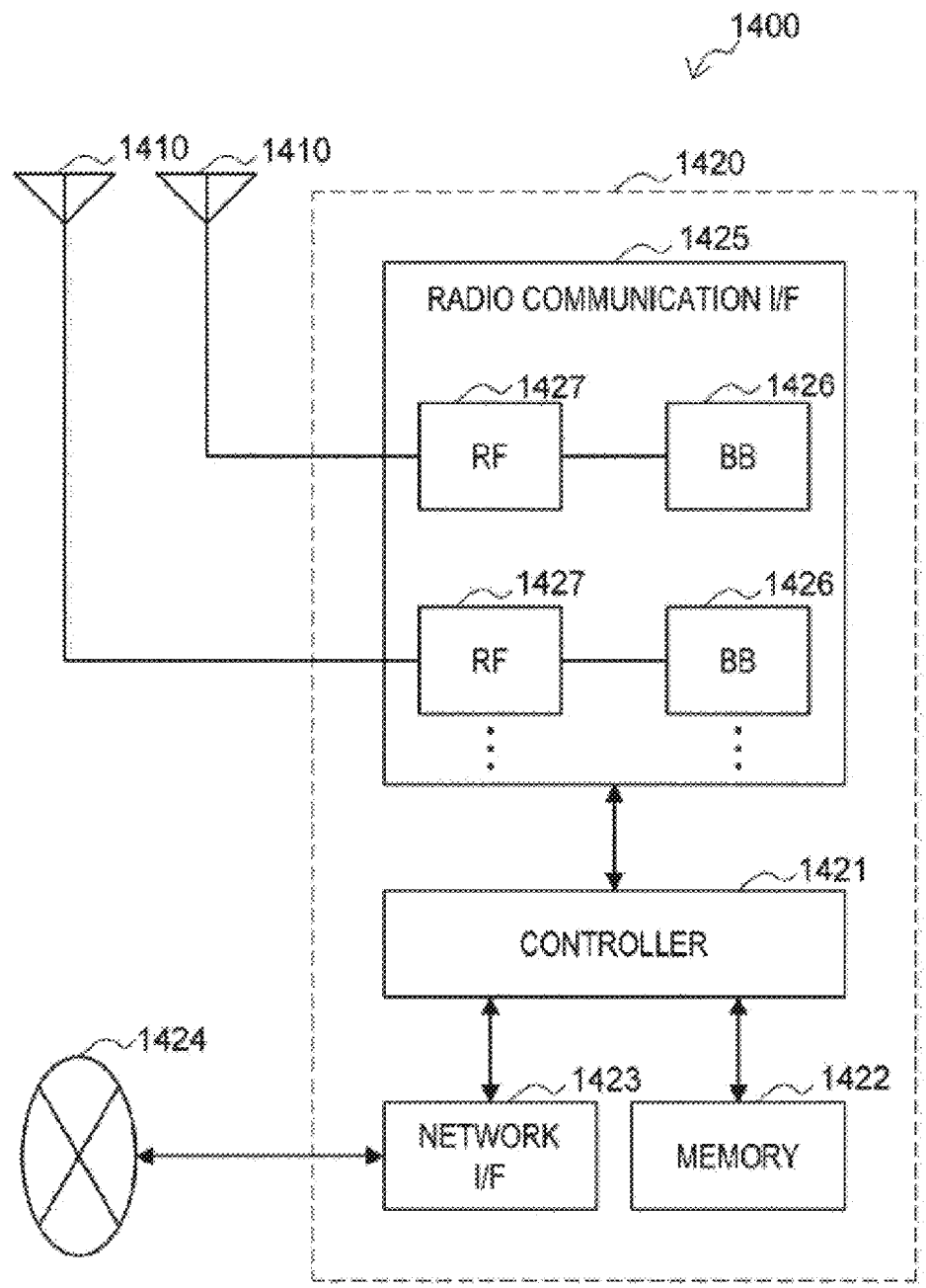
FIG. 14 is a block diagram illustrating a first example of a schematic configuration of a gNB to which the technology of the present disclosure can be applied.

FIG. 14 is a block diagram illustrating a first example of a schematic configuration of a gNB to which the technology of the present disclosure can be applied. A gNB 1400 includes multiple antennas 1410 and a base station device 1420. The base station device 1420 and each of the antennas 1410 may be connected to each other via an RF cable. In one implementation, the gNB 1400 (or the base station device 1420) herein may correspond to the electronic devices 300A, 1300A, and/or 1500B described above.

Each of the antennas 1410 includes one or more antenna elements (such as multiple antenna elements included in a multiple input and multiple output (MIMO) antenna), and is used for the base station device 1420 to transmit and receive radio signals. As shown in FIG. 14, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, the controller 1421 generates data packets based on data in signals processed by the radio communication interface 1425, and transfers the generated packets via the network interface 1423. The controller 1421 can bundle data from multiple baseband processors to generate bundled packets, and transfer the generated bundled packets. The controller 1421 may have logic functions of performing control such as radio resource control, radio bearer control, mobility management, admission control, and scheduling. Such control may be performed in corporation with a gNB or a core network node in the vicinity. The memory 1422 includes a RAM and a ROM, and stores a program that is executed by the controller 1421 and various types of control data (such as a terminal list, transmission power data, and scheduling data).

The network interface 1423 is a communication interface for connecting the base station device 1420 to a core network 1424. The controller 1421 may communicate with a core network node or another gNB via the network interface 1423. In this case, the gNB 1400 and the core network node or the another gNB may be connected to each other through a logical interface (such as an S1 interface and an X2 interface). The network interface 1423 may alternatively be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes (such as Long Term Evolution (LTE) and LTE-Advanced), and provides, via the antenna 1410, wireless connection to a terminal located in a cell of the gNB 1400. The radio communication interface 1425 may typically include, for example, a baseband (BB) processor 1426 and an RF circuit 1427. The BB processor 1426 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). In place of the controller 1421, the BB processor 1426 may have a part or all of the above-described logic functions. The BB processor 1426 may be a memory that stores a communication control program, or a module that includes a processor configured to execute the program and a related circuit. Updating the program may change the functions of the BB processor 1426. The module may be a card or a blade that is inserted into a slot of the base station device 1420. Alternatively, the module may also be a chip that is mounted on the card or the blade. In addition, the RF circuit 1427 may include, for example, a mixer, a filter, and an amplifier, and transmits and receives radio signals via the antenna 1410. Although FIG. 14 illustrates an example in which one RF circuit 1427 is connected to one antenna 1410, the present disclosure is not limited thereto; rather, one RF circuit 1427 may be connected to a plurality of antennas 1410 at the same time.

As shown in FIG. 14, the radio communication interface 1425 may include multiple BB processors 1426. For example, the multiple BB processors 1426 may be compatible with multiple frequency bands used by the gNB 1400. As shown in FIG. 14, the radio communication interface 1425 may include multiple RF circuits 1427. For example, the multiple RF circuits 1427 may be compatible with multiple antenna elements. Although FIG. 14 illustrates an example in which the radio communication interface 1425 includes multiple BB processors 1426 and multiple RF circuits 1427, the radio communication interface 1425 may alternatively include a single BB processor 1426 or a single RF circuit 1427.

Second Use Case

Figure 15:
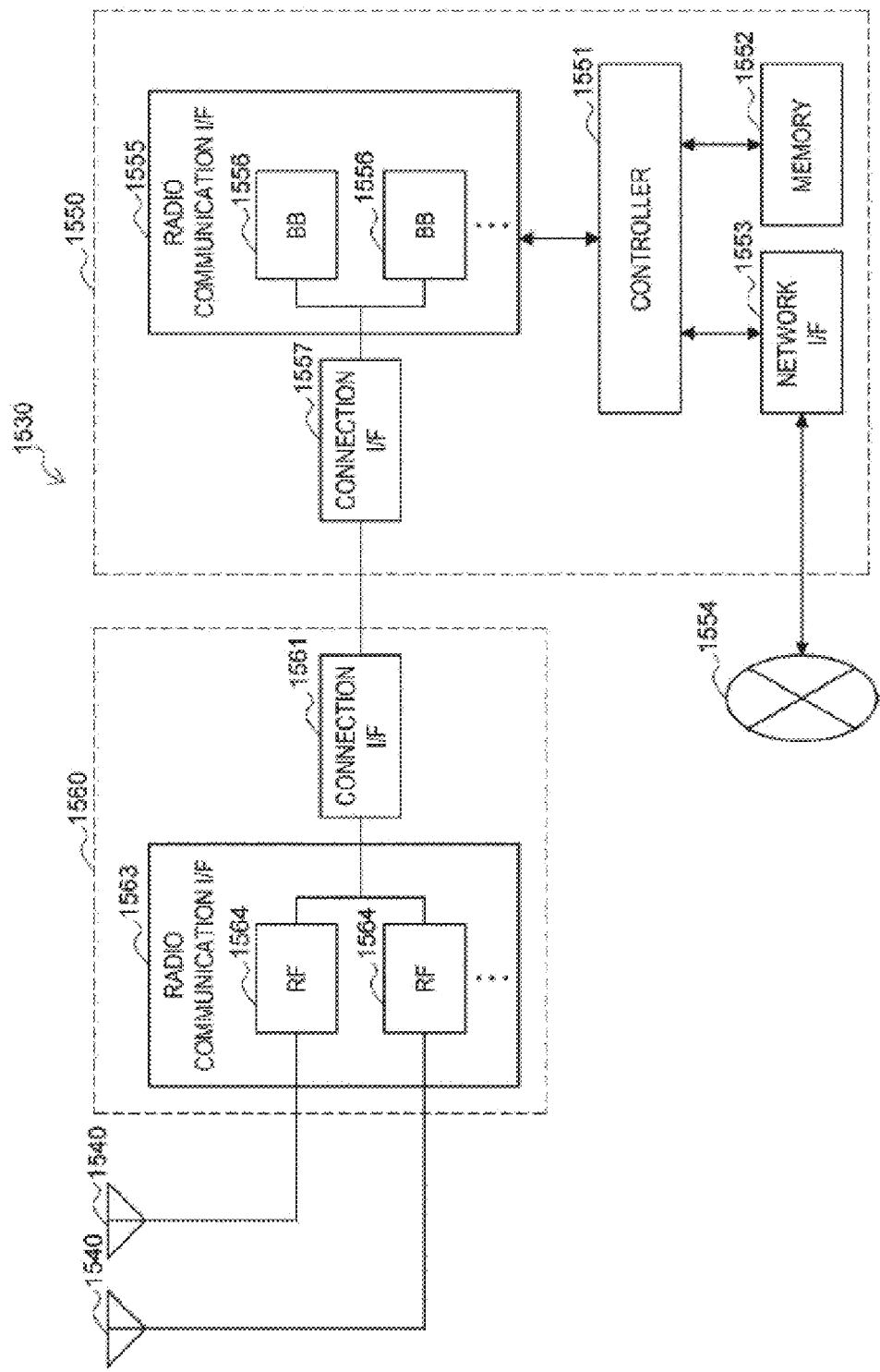
FIG. 15 is a block diagram illustrating a second example of a schematic configuration of a gNB to which the technology of the present disclosure can be applied.

FIG. 15 is a block diagram illustrating a second example of a schematic configuration of a gNB to which the technology of the present disclosure can be applied. A gNB 1530 includes multiple antennas 1540, a base station device 1550, and a RRH 1560. The RRH 1560 and each of the antennas 1540 may be connected to each other via an RF cable. The base station device 1550 and the RRH 1560 may be connected to each other via a high speed line such as a fiber optic cable. In one implementation, the gNB 1530 (or the base station device 1550) herein may correspond to the electronic devices 300A, 1300A, and/or 1500B described above.

Each of the antennas 1540 includes one or more antenna elements (such as multiple antenna elements included in a MIMO antenna), and is used for the RRH 1560 to transmit and receive radio signals. As shown in FIG. 15, the gNB 1530 may include multiple antennas 1540. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE, LTE-Advanced, and NR) and provides radio communication to terminals located in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except that the BB processor 1556 is connected to an RF circuit 1564 of the RRH 1560 via the connection interface 1557. As shown in FIG. 15, the radio communication interface 1555 may include multiple BB processors 1556. For example, the multiple BB processors 1556 may be compatible with multiple frequency bands used by the gNB 1530. Although FIG. 15 illustrates an example in which the radio communication interface 1555 includes multiple BB processors 1556, the radio communication interface 1555 may alternatively include a single BB processor 1556.

The connection interface 1557 is an interface for connecting the base station device 1550 (radio communication interface 1555) to the RRH 1560. The connection interface 1557 may further be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may further be a communication module for communication in the above-described high speed line.

The radio communication interface 1563 transmits and receives radio signals via the antenna 1540. The radio communication interface 1563 may typically include, for example, an RF circuit 1564. The RF circuit 1564 may include, for example, a mixer, a filter, and an amplifier, and transmits and receives radio signals via the antenna 1540. Although FIG. 15 illustrates an example in which one RF circuit 1564 is connected to one antenna 1540, the present disclosure is not limited thereto; rather, one RF circuit 1564 may be connected to a plurality of antennas 1540 at the same time.

As shown in FIG. 15, the radio communication interface 1563 may include multiple RF circuits 1564. For example, the multiple RF circuits 1564 may support multiple antenna elements. Although FIG. 15 illustrates an example in which the radio communication interface 1563 includes multiple RF circuits 1564, the radio communication interface 1563 may alternatively include a single RF circuit 1564.

[Use Cases Regarding User Equipment]
First Use Case

Figure 16:
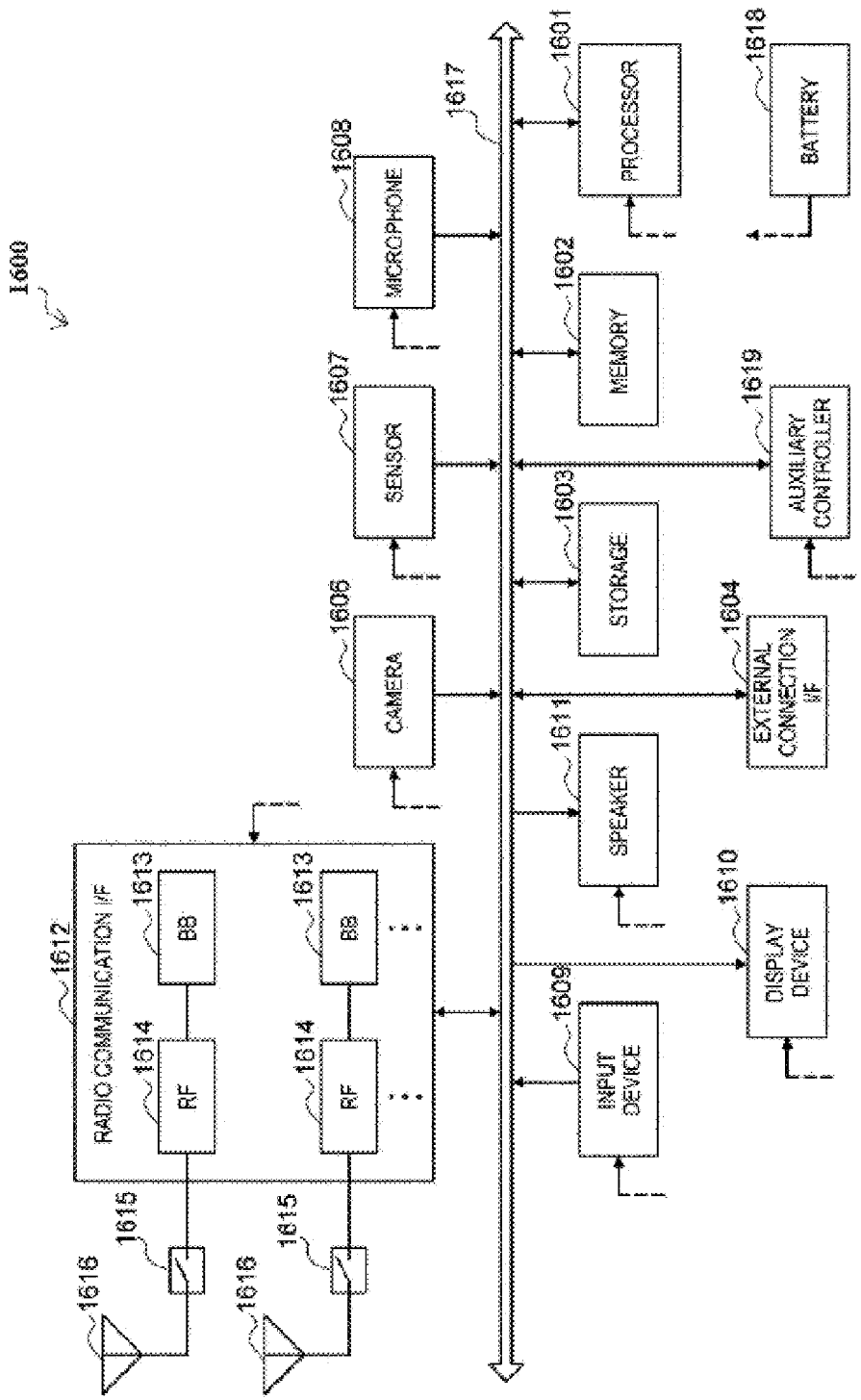
FIG. 16 is a block diagram illustrating an example of a schematic configuration of a smartphone to which the technology of the present disclosure can be applied.

FIG. 16 is a block diagram illustrating an example of a schematic configuration of a smartphone to which the technology of the present disclosure can be applied. A smartphone 1600 includes a processor 1601, a memory 1602, a storage device 1603, an external connection interface 1604, a camera device 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619. In an implementation, the smartphone 1600 (or the processor 1601) herein may correspond to the above-described terminal device 300B and/or 1500A.

The processor 1601 may be, for example, a CPU or a system on a chip (SoC), and controls functions of the application layer and other layers of the smartphone 1600. The memory 1602 includes a RAM and a ROM, and stores a program that is executed by the processor 1601. The storage device 1603 may include a storage medium such as a semiconductor memory and a hard disk. The external connection interface 1604 is an interface for connecting an external device (for example, a memory card and a Universal Serial Bus (USB) device) to the smartphone 1600.

The camera device 1606 includes an image sensor (for example, a charge coupled device (CCD) and a complementary metal oxide semiconductor (CMOS)), and generates a captured image. The sensor 1607 may include a set of sensors, such as a measurement sensor, a gyro sensor, a geomagnetic sensor, and an acceleration sensor. The microphone 1608 converts the sound input of the smart phone 1600 into an audio signal. The input device 1609 includes, for example, a touch sensor configured to detect touches on the screen of the display device 1610, a keypad, a keyboard, buttons, or switches, and receives input operations or information of a user. The display device 1610 includes a screen (for example, a liquid crystal display (LCD) and an organic light emitting diode (OLED) display), and displays output images of the smartphone 1600. The speaker 1611 converts output audio signals of the smartphone 1600 into sound.

The radio communication interface 1612 supports any cellular communication scheme (such as LTE, LTE-Advanced, and NR) and performs radio communication. The radio communication interface 1612 may typically include, for example, a BB processor 1613 and an RF circuit 1614. The BB processor 1613 may perform, for example, encoding/decoding, modulation/demodulation, and multiplexing/demultiplexing, and performs various types of signal processing for radio communication. In addition, the RF circuit 1614 may include, for example, a mixer, a filter, and an amplifier, and transmits and receives radio signals via the antenna 1616. The radio communication interface 1612 may be a chip module on which the BB processor 1613 and the RF circuit 1614 are integrated. As shown in FIG. 16, the radio communication interface 1612 may include multiple BB processors 1613 and multiple RF circuits 1614. Although FIG. 16 illustrates an example in which the radio communication interface 1612 includes multiple BB processors 1613 and multiple RF circuits 1614, the radio communication interface 1612 may alternatively include a single BB processor 1613 or a single RF circuit 1614.

In addition to a cellular communication scheme, the radio communication interface 1612 can support other types of radio communication schemes, such as a short-range wireless communication scheme, a near-field communication scheme, and a wireless local area network (LAN) scheme. In this case, the radio communication interface 1612 may include the BB processor 1613 and the RF circuit 1614 as to each radio communication scheme.

Each of the antenna switches 1615 switches the connection destination of the antenna 1616 among multiple circuits (for example, circuits for different radio communication schemes) included in the radio communication interface 1612.

Each of the antennas 1616 includes one or more antenna elements (such as multiple antenna elements included in a MIMO antenna), and is used for the radio communication interface 1612 to transmit and receive radio signals. As shown in FIG. 16, the smartphone 1600 may include multiple antennas 1616. Although FIG. 16 illustrates an example in which the smartphone 1600 includes multiple RF circuits 1616, the radio communication interface 1600 may alternatively include a single RF circuit 1616.

In addition, the smartphone 1600 may include the antennas 1616 for every radio communication scheme. In this case, the antenna switch 1615 can be removed from configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the radio communication interface 1612, and the auxiliary controller 1619. The battery 1618 provides power for various blocks of the smartphone 1600 illustrated in FIG. 16 via feeders, and the feeders are partially expressed as dashed lines in the figure. The auxiliary controller 1619, for example, operates the minimum necessary functions of the smartphone 1600 in sleep mode.

Second Use Case

Figure 17:
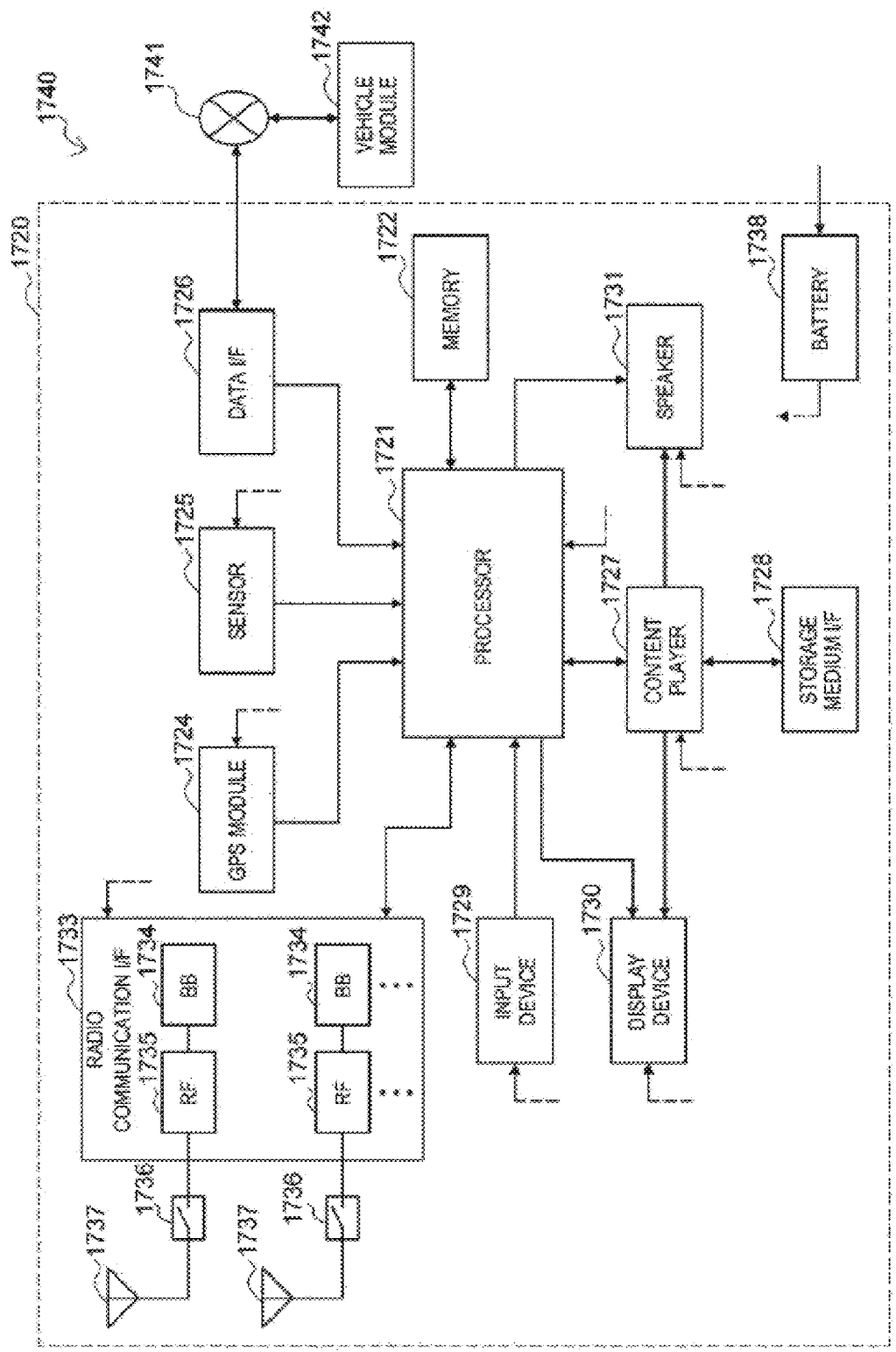
FIG. 17 is a block diagram illustrating an example of a schematic configuration of a car navigation device to which the technology of the present disclosure can be applied.

FIG. 17 is a block diagram illustrating an example of a schematic configuration of a car navigation device to which the technology of the present disclosure can be applied. A car navigation device 1720 includes a processor 1721, a memory 1722, a global positioning system (GPS) 1724, a sensor 1725, a data interface 1726, a content player 1727, a storage medium interface 1728, an input device 1729, a display device 1730, a speaker 1731, a radio communication interface 1733, one or more antenna switches 1736, one or more antennas 1737, and a battery 1738. In an implementation, the car navigation device 1720 (or the processor 1721) herein may correspond to the above-described terminal device 300B and/or 1500A.

The processor 1721 may be, for example, a CPU or a SoC, and controls the navigation function and other functions of the car navigation device 1720. The memory 1722 includes a RAM and a ROM, and stores a program that is executed by the processor 1721.

The GPS module 1724 measures a location (such as a latitude, a longitude, and an altitude) of the car navigation device 1720 by using GPS signals received from GPS satellites. The sensor 1725 may include a set of sensors, such as a gyro sensor, a geomagnetic sensor, and an air pressure sensor. The data interface 1726 is connected to, for example, an in-vehicle network 1741 via a terminal not shown, and acquires data generated by the vehicle (such as vehicle speed data).

The content player 1727 plays back content stored in a storage medium (such as a CD and a DVD), which is inserted into the storage medium interface 1728. The input device 1729 includes, for example, a touch sensor configured to detect touches on the screen of the display device 1730, buttons, or switches, and receives input operations or information of a user. The display device 1730 includes a screen, for example, an LCD or OLED screen, and displays images for the navigation function or playback content. The speaker 1731 outputs the sound for the navigation function or playback content.

The radio communication interface 1733 supports any cellular communication scheme (such as LTE, LTE-Advanced, and NR) and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. In addition, the RF circuit 1735 may include, for example, a mixer, a filter, and an amplifier, and transmits and receives radio signals via the antenna 1737. The radio communication interface 1733 may further be a chip module on which the BB processor 1734 and the RF circuit 1735 are integrated. As shown in FIG. 17, the radio communication interface 1733 may include multiple BB processors 1734 and multiple RF circuits 1735. Although FIG. 17 illustrates an example in which the radio communication interface 1733 includes multiple BB processors 1734 and multiple RF circuits 1735, the radio communication interface 1733 may alternatively include a single BB processor 1734 or a single RF circuit 1735.

In addition to a cellular communication scheme, the radio communication interface 1733 can support other types of radio communication schemes, such as a short-range wireless communication scheme, a near-field communication scheme, and a wireless LAN scheme. In this case, the radio communication interface 1733 may include the BB processor 1734 and the RF circuit 1735 as to each radio communication scheme.

Each of the antenna switches 1736 switches the connection destination of the antenna 1737 among multiple circuits (for example, circuits for different radio communication schemes) included in the radio communication interface 1733.

Each of the antennas 1737 includes one or more antenna elements (such as multiple antenna elements included in a MIMO antenna), and is used for the radio communication interface 1733 to transmit and receive radio signals. As shown in FIG. 17, the car navigation device 1720 may include multiple antennas 1737. Although FIG. 17 illustrates an example in which the car navigation device 1720 includes multiple antennas 1737, the car navigation device 1720 may alternatively include a single antenna 1737.

In addition, the car navigation device 1720 may include the antennas 1737 for every radio communication scheme. In this case, the antenna switch 1736 can be removed from configuration of the car navigation device 1720.

The battery 1738 provides power for various blocks of the car navigation device 1720 illustrated in FIG. 17 via feeders, and the feeders are partially expressed as dashed lines in the figure. The battery 1738 accumulates power supplied by the vehicle.

The technology of the present disclosure may also be implemented as an in-vehicle system (or vehicle) 1740 including one or more blocks of the car navigation device 1720, the in-vehicle network 1741, and a vehicle module 1742. The vehicle module 1742 generates vehicle data (such as vehicle speed, engine speed, and failure information), and outputs the generated data to the in-vehicle network 1741.

The solution of the present disclosure may be implemented as shown in the example below.

1. An electronic device for a first terminal device, where the electronic device includes a processing circuit, and the processing circuit is configured to:
   search for time-frequency resources based on at least two allocation modes to obtain a candidate resource set;
   select a time-frequency resource from the candidate resource set;
   notify a second terminal device of the selected time-frequency resource to be used for sidelink communication with the second terminal device; and
   send resource selection information to a base station, where the resource selection information indicates whether a specified resource is selected.

2. The electronic device of clause 1, where the searching for time-frequency resources based on at least two allocation modes includes:
   for a first allocation mode, sending a resource scheduling request message to the base station, and receiving a resource grant message from the base station; and
   for a second allocation mode, perceiving and searching for time-frequency resources, where the candidate resource set includes time-frequency resources corresponding to the first and second allocation modes.

3. The electronic device of clause 2, where the perceiving and searching for time-frequency resources for the second allocation mode includes:
perceiving resources in a resource window, and selecting a desired resource based on a perception result.

4. The electronic device of clause 1, where the searching for time-frequency resources based on at least two allocation modes includes:
for a first allocation mode, sending a resource scheduling request message to the base station, and receiving a resource grant message from the base station; and
for a third allocation mode, sending a resource scheduling request message to a cluster scheduling device, and receiving a resource grant message from the cluster scheduling device;
where the candidate resource set includes time-frequency resources corresponding to the first and third allocation modes.

5. The electronic device of clause 4, where the first terminal device is used as the resource scheduling device, and the processing circuit is configured to:
send a resource pool scheduling request message to the base station, and receive a resource pool grant message from the base station; and
in response to a resource scheduling request message from a specified terminal device, select a time-frequency resource from the resource pool, so as to provide grant for the specified terminal device.

6. The electronic device of clause 2 or 4, where the selecting the time-frequency resource includes:
selecting the time-frequency resource based on a QoS requirement of sidelink communication and attributes of time-frequency resources in the candidate resource set, where a time-frequency resource corresponding to one or more allocation modes is selected.

7. The electronic device of clause 6, where the resource selection information indicates, to the base station, whether a time-frequency resource corresponding to the first allocation mode is selected.

8. The electronic device of clause 7, where the resource selection information further indicates, to the base station, a time-frequency resource selected from time-frequency resources corresponding to the second or third allocation mode.

9. The electronic device of clause 1, the processing circuit is further configured to: receive, from the base station, parameter configurations of the at least two allocation modes by using radio resource control RRC signaling.

10. The electronic device of clause 1, where the processing circuit is further configured to: receive, from the second terminal device, information on a time-frequency resource selected by the second terminal device, where the information on the time-frequency resource is used for receiving sidelink communication from the second terminal device.

11. The electronic device of clause 1, where the processing circuit is further configured to:
transmit specific time-frequency resource information or index by using sidelink control information to notify the second terminal device of the selected time-frequency resource.

12. An electronic device for a base station, where the electronic device includes a processing circuit, and the processing circuit is configured to:
receive a resource scheduling request message from a first terminal device, where the resource scheduling request message is used to request a time-frequency resource for sidelink communication between the first terminal device and a second terminal device;
allocate the time-frequency resource to the first terminal device based on a first allocation mode;
send a resource grant message to the first terminal device; and
receive resource selection information from the first terminal device, where the resource selection information indicates whether the time-frequency resource corresponding to the first allocation mode is selected by the first terminal device.

13. The electronic device of clause 12, where the resource selection information further indicates a time-frequency resource selected by the first terminal device from time-frequency resources corresponding to at least another one allocation mode.

14. The electronic device of clause 12, where the processing circuit is further configured to: send, to the first terminal device, parameter configurations of the first allocation mode and the at least another one allocation mode by using radio resource control RRC signaling.

15. A method for wireless communication, including:
by a first terminal device:
searching for time-frequency resources based on at least two allocation modes to obtain a candidate resource set;
selecting a time-frequency resource from the candidate resource set;
notifying a second terminal device of the selected time-frequency resource to be used for sidelink communication with the second terminal device; and
sending resource selection information to a base station, where the resource selection information indicates whether a specified resource is selected.

16. The method of clause 15, where the searching for time-frequency resources based on at least two allocation modes includes:
for a first allocation mode, sending a resource scheduling request message to the base station, and receiving a resource grant message from the base station; and
for a second allocation mode, perceiving and searching for time-frequency resources,
where the candidate resource set includes time-frequency resources corresponding to the first and second allocation modes.

17. The electronic device of clause 15, where the searching for time-frequency resources based on at least two allocation modes includes:
for a first allocation mode, sending a resource scheduling request message to the base station, and receiving a resource grant message from the base station; and
for a third allocation mode, sending a resource scheduling request message to a cluster scheduling device, and receiving a resource grant message from the cluster scheduling device;
where the candidate resource set includes time-frequency resources corresponding to the first and third allocation modes.

18. A method for wireless communication, including:
by a base station:
receiving a resource scheduling request message from a first terminal device, where the resource scheduling request message is used to request a time-frequency resource for sidelink communication between the first terminal device and a second terminal device;

allocating the time-frequency resource to the first terminal device based on a first allocation mode;

sending a resource grant message to the first terminal device; and receiving resource selection information from the first terminal device, where the resource selection information indicates whether the time-frequency resource corresponding to the first allocation mode is selected by the first terminal device.

19. A computer-readable storage medium with one or more instructions stored therein, where the one or more instructions, when executed by one or more processing circuits of an electronic device, cause the electronic device to perform the method of any one of clauses 15 to 18.

20. An apparatus for wireless communication, including means for performing operations of the method of any one of clauses 15 to 18.

The exemplary embodiments of the present disclosure have been described above with reference to the drawings, but the present disclosure is certainly not limited to the foregoing examples. Those skilled in the art can acquire various changes and modifications within the scope of the appended claims, and it should be understood that these changes and modifications will naturally fall within the technical scope of the present disclosure.

For example, multiple functions included in one unit in the foregoing embodiments may be implemented by separate apparatuses. Alternatively, the multiple functions implemented by the multiple units in the foregoing embodiments may be implemented by separate apparatuses respectively. In addition, one of the foregoing functions may be implemented by multiple units. Needless to say, such a configuration is included in the technical scope of the present disclosure.

In this specification, the steps described in the flowchart include not only processes performed sequentially in time order, but also processes performed in parallel or individually rather than necessarily in time order. In addition, even in the steps processed in time order, needless to say, the sequence can be changed appropriately.

Although the present disclosure and its advantages have been described in detail, it should be understood that various modifications, replacements, and changes can be made without departing from the spirit and scope of the present disclosure as defined by the appended claims. Moreover, terms "comprise", "include", or any other variations thereof are intended to cover non-exclusive inclusions, so that processes, methods, articles or devices containing a series of elements not only contain these elements, but also contain other elements which are not clearly listed, or further contain elements which are inherent to these processes, methods, articles or devices. Under the condition of no more limitations, an element defined by the statement "including . . . " does not exclude existence of the same other elements in a process, method, articles or device including the element.

The invention claimed is:

1. An electronic device for a first terminal device, wherein the electronic device comprises a processing circuit, and the processing circuit is configured to:

search for time-frequency resources based on at least two allocation modes to obtain a candidate resource set;

select a time-frequency resource from the candidate resource set;

notify a second terminal device of the selected time-frequency resource to be used for sidelink communication with the second terminal device; and send resource selection information to a base station, wherein the resource selection information indicates whether a specified resource is selected, wherein the search for the time-frequency resources based on at least two allocation modes comprises:

for a first allocation mode, sending a resource scheduling request message to the base station, and receiving a resource grant message from the base station; and for a third allocation mode, sending a resource scheduling request message to a cluster scheduling device, and receiving a resource grant message from the cluster scheduling device, wherein the candidate resource set comprises time-frequency resources corresponding to the first and third allocation modes.

2. The electronic device of claim 1, wherein the searching for time-frequency resources based on at least two allocation modes further comprises:

for a second allocation mode, perceiving and searching for time-frequency resources, wherein the candidate resource set further comprises time-frequency resources corresponding to the second allocation mode.

3. The electronic device of claim 2, wherein the perceiving and searching for time-frequency resources for the second allocation mode comprises:

perceiving resources in a resource window, and selecting a desired resource based on a perception result.

4. The electronic device of claim 2, wherein the selecting the time-frequency resource comprises:

selecting the time-frequency resource based on a QoS requirement of sidelink communication and attributes of time-frequency resources in the candidate resource set, wherein a time-frequency resource corresponding to one or more allocation modes is selected.

5. The electronic device of claim 4, wherein the resource selection information indicates, to the base station, whether a time-frequency resource corresponding to the first allocation mode is selected.

6. The electronic device of claim 5, wherein the resource selection information further indicates, to the base station, a time-frequency resource selected from time-frequency resources corresponding to the second or third allocation mode.

7. The electronic device of claim 1, wherein the first terminal device is used as the cluster scheduling device, and the processing circuit is configured to:

send a resource pool scheduling request message to the base station, and receive a resource pool grant message from the base station; and in response to a resource scheduling request message from a specified terminal device, select a time-frequency resource from the resource pool, so as to provide grant for the specified terminal device.

8. The electronic device of claim 1, the processing circuit is further configured to: receive, from the base station, parameter configurations of the at least two allocation modes by using radio resource control RRC signaling.

9. The electronic device of claim 1, where the processing circuit is further configured to: receive, from the second terminal device, information on a time-frequency resource selected by the second terminal device, where the information on the time-frequency resource is used for receiving sidelink communication from the second terminal device.

10. The electronic device of claim 1, wherein the processing circuit is further configured to:
transmit specific time-frequency resource information or index by using sidelink control information to notify the second terminal device of the selected time-frequency resource.

11. A method for wireless communication, comprising:
by a first terminal device:
searching for time-frequency resources based on at least two allocation modes to obtain a candidate resource set;
selecting a time-frequency resource from the candidate resource set;
notifying a second terminal device of the selected time-frequency resource to be used for sidelink communication with the second terminal device; and
sending resource selection information to a base station, wherein the resource selection information indicates whether a specified resource is selected,
wherein the searching for the time-frequency resources based on at least two allocation modes comprises:
for a first allocation mode, sending a resource scheduling request message to the base station, and receiving a resource grant message from the base station; and
for a third allocation mode, sending a resource scheduling request message to a cluster scheduling device, and receiving a resource grant message from the cluster scheduling device,
wherein the candidate resource set comprises time-frequency resources corresponding to the first and third allocation modes.

12. The method of claim 11, wherein the searching for time-frequency resources based on at least two allocation modes further comprises:
for a second allocation mode, perceiving and searching for time-frequency resources,
wherein the candidate resource set further comprises time-frequency resources corresponding to the second allocation mode.

* * * * *